United States Patent
O'Neill

(10) Patent No.: US 7,027,400 B2
(45) Date of Patent: Apr. 11, 2006

(54) MESSAGES AND CONTROL METHODS FOR CONTROLLING RESOURCE ALLOCATION AND FLOW ADMISSION CONTROL IN A MOBILE COMMUNICATIONS SYSTEM

(75) Inventor: Alan O'Neill, Henley Beach (AU)

(73) Assignee: Flarion Technologies, Inc., Bedminster, NJ (US)

( * ) Notice: Subject to any disclaimer, the term of this patent is extended or adjusted under 35 U.S.C. 154(b) by 0 days.

(21) Appl. No.: 10/739,925

(22) Filed: Dec. 18, 2003

(65) Prior Publication Data
US 2004/0174865 A1 Sep. 9, 2004

Related U.S. Application Data

(63) Continuation-in-part of application No. 10/172,357, filed on Jun. 14, 2002.

(60) Provisional application No. 60/434,307, filed on Dec. 18, 2002, provisional application No. 60/434,305, filed on Dec. 18, 2002, provisional application No. 60/301,069, filed on Jun. 26, 2001.

(51) Int. Cl.
*H04L 12/26* (2006.01)

(52) U.S. Cl. .................. 370/235; 370/401; 370/468

(58) Field of Classification Search ............... 370/235, 370/236, 338, 468, 230, 401, 352
See application file for complete search history.

(56) References Cited

U.S. PATENT DOCUMENTS

| | | | |
|---|---|---|---|
| 5,420,909 A | 5/1995 | Ng et al. | |
| 6,134,226 A | 10/2000 | Reed et al. | |
| 6,160,798 A | 12/2000 | Reed et al. | |
| 6,353,616 B1 | 3/2002 | Elwalid et al. | |
| 6,366,577 B1 | 4/2002 | Donovan | |
| 6,445,922 B1 | 9/2002 | Hiller et al. | |
| 6,452,915 B1 * | 9/2002 | Jorgensen | 370/338 |
| 6,487,170 B1 | 11/2002 | Chen et al. | |
| 6,496,505 B1 | 12/2002 | La Porta et al. | |
| 6,519,254 B1 | 2/2003 | Chuah et al. | |
| 6,567,416 B1 | 5/2003 | Chuah | |
| 6,631,122 B1 | 10/2003 | Arunachalam et al. | |
| 6,654,363 B1 | 11/2003 | Li et al. | |

(Continued)

OTHER PUBLICATIONS

PCT International Search Report for International Application No. PCT/US03/40570, Dec. 2003.

(Continued)

*Primary Examiner*—Ricky Q. Ngo
*Assistant Examiner*—Nguyen Ngo
(74) *Attorney, Agent, or Firm*—Straub & Pokotylo; Michael P. Straub

(57) ABSTRACT

Methods and apparatus for aggregating IP packets over an access link between a wireless access router and a core node and for managing resource allocation to access link packet aggregates, e.g., as a function of the status of wireless communications links used to couple mobile nodes to the access router are described. Improved aggregate resource control messages and use of such messages are described. Some of the new messages allow aggregate resources for both upstream and downstream aggregates to be controlled in a single message. A single message may include information corresponding to multiple aggregates and/or multiple constituent flows included in an aggregate with aggregate direction information being included. Use of tunnels to communicate management messages, e.g., messages used to control resource allocation to aggregates is also described. Propagation of access link aggregate information is communicated to tunnel end nodes which generate packets that are communicated over the access link.

25 Claims, 17 Drawing Sheets

U.S. PATENT DOCUMENTS

| | | | |
|---|---|---|---|
| 6,687,655 | B1* | 2/2004 | Oosthoek et al. ............ 702/186 |
| 2002/0018456 | A1* | 2/2002 | Kakemizu et al. .......... 370/338 |
| 2002/0026527 | A1 | 2/2002 | Das et al. |
| 2002/0191593 | A1 | 12/2002 | O'Neill et al. |
| 2003/0137961 | A1 | 7/2003 | Tsirtsis et al. |
| 2003/0176188 | A1 | 9/2003 | O'Neill |

OTHER PUBLICATIONS

IETF, Network Working Group, Request for Comments: 2205, *Resource Reservation Protocol (RSVP)—Version 1 Functional Specification*, pp. 1-105 (Sep. 1997).

IETF, Network Working Group, Request for Comments: 2206, *RSVP Management Information Base Using SMIv2*, pp. 1-60 (Sep. 1997).

IETF, Network Working Group, Request for Comments: 2207, *RSVP Extension for IPSEC Data Flows*, pp. 1-14 (Sep. 1997).

IETF, Network Working Group, Request for Comments: 2210, *The Use of RSVP with IETF Integrated Services*, pp. 1-31 (Sep. 1997).

IETF, Network Working Group, Request for Comments: 2208, *Resource Reservation Protocol (RSVP)Version 1 Applicability Statement Some Guidelines on Deployment*, pp. 1-6 (Sep. 1997).

IETF, Network Working Group, Request for Comments: 2209, *Resource Reservation Protocol (RSVP)—Version 1 Message Processing Rules*, pp. 1-24 (Sep. 1997).

IETF Network Working Group, Request for Comments: 2961, *RSVP Refresh Overhead Reduction Extensions*, pp. 1-32 (Apr. 2001).

C. Perkins, Editor "IP Mobility Support", Network Working Group, pp. 1-79 (Oct. 1996).

Li, Yalun "Protocol Architecture for Universal Personal Computing" IEEE Journal on Selected Areas in Communications 15(8): 1467-1476 (1997).

J. Moy, Editor, "OSPF Version 2", Network Working Group, pp. 1-244 (Apr. 1998).

Valko, Andras "Cellular IP: A New Approach to Internet Host Mobility" Computer Communications Review 29(1): 50-65 (1999).

Andras G. Valko, "Cellular IP—A New Approach to Internet Host Mobility," ACM Computer Communication Review, vol. 29, No. 1, pp. 50-65, Jan. 1999.

TIA/EIA/IS-707A.8 "Data Service Options for Spread Spectrum Systems: Radio Link Protocol Type 2" pp. 1-1:4:12 (Mar. 1999).

Karagiannis, Mobile IP, State of the Art Report, pp. 1-63, Jul. 1999.

Elin Wedlund et al., "Mobility Support Using SIP", Proc. Of ACM/IEEE International Conference on Wireless and Mobile Multimedia (WoWMoM'99), Seattle, Washington, Aug. 1999.

Henning Schulzrinne et al., "Application-Layer Mobility Using SIP", 0-7803-7133 IEEE, pp. 29-36, Jan. 2000.

Marshall, W., et al., Integration of Resource Management and SIP, IETF Internet Draft, draft-ietf-sip-manyfolks-resource-02.txt, Aug. 2001, pp. 1-28.

S. Zhou et al., "A Location Management Scheme for Support Mobility In Wireless IP Networks Using Session Initiation Protocol (SIP)", 1531-2216/01 IEEE, Oct. 2001, pp. 486-491.

Andrew T. Campbell et al., "IP Micro-Mobility Protocols", ACM Sigmobile Mobile Computer and Communication Review (MC2R), vol. 4, No. 4, pp. 34-54, Oct. 2001.

Bos, L., et al., A Framework for End-to-End Perceived Quality of Service Negotiation, IETF Internet Draft, draft-bos-mmusic-sdpqos-framework-00.txt, Nov. 2001, pp. 1-22.

Papalilo, D., et al., Extending SIP for QoS Support www.coritel.it/publications/IP_download/papalilo-salsano-veltri.pdf, Dec. 8, 2001, pp. 1-6.

Camarillo, P., et al., Integration of Resource Management and SIP, IETF Internet Draft, draft-ietf-sip-manyfolks-resource-04.ps, Feb. 25, 2002 pp. 1-18.

Ho, Integration AAA with Mobile IPv4, Internet Draft, pp. 1-59, Apr. 2002.

"SIP: Session Initiation Protocol", IEFT Network Wording Group, Request for Comments: 3261, (Jun. 2002), pps 1-29.

IETF, Network Working Group, Request for Comments: 3261 "SIP: Session Initiation Protocol", pp. 1-269 (printed as pp. 1-252) (Jun. 2002).

NetworkWorking Group, IPv6 Prefix Delegation Using ICMPv6, pps 1-33, Apr. 2004.

Network Working Group, "IP Mobility Support for IPv4", C. Perkins, Ed., Nokia Research Center, Jan. 2002, downloaded from http://www.ietf.org on Dec. 29, 2004, pp. 1-92.

IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.

* cited by examiner

1400

| Source Address | Destination Addr | Message Identifier | Aggregate Identifier 1 | Aggregate Direction 1 ,e.g. Down | Aggregate Resources 1 | Agg Resource Type Indicator 1 | Agg Classifier 1 | Const Identifier 1 | Const Classifier 1 | Const Resources 1 | Resource Type Indicator 1 |
|---|---|---|---|---|---|---|---|---|---|---|---|
| 59 | 60 | 61 | 62 | 63 | 64 | 65 | 66 | 67 | 68 | 69 | 70 |
| | | | Aggregate Identifier 2 | Aggregate Direction 2 ,e.g. Down | Aggregate Resources 2 | Agg Resource Type Indicator 2 | Agg Classifier 2 | Const Identifier 2A | Const Classifier 2A | Const Resources 2A | Resource Type Indicator 2A |
| | | | 62' | 63' | 64' | 65' | 66' | 67' | 68' | 69' | 70' |
| | | | | | | | | Const Identifier 2B | Const Classifier 2B | Const Resources 2B | Resource Type Indicator 2B |
| | | | | | | | | 67" | 68" | 69" | 70" |
| | | | Aggregate Identifier 3 | Aggregate Direction 3 ,e.g. UP | Aggregate Resources 3 | Agg Resource Type Indicator 3 | Agg Classifier 3 | Const Identifier 3A | Const Classifier 3A | Const Resources 3A | Resource Type Indicator 3A |
| | | | 62''' | 63''' | 64''' | 65''' | 66''' | 67''' | 68''' | 69''' | 70''' |
| | | | | | | | | Const Identifier 3B | Const Classifier 3B | Const Resources 3B | Resource Type Indicator 3B |
| | | | | | | | | 67'''' | 68'''' | 69'''' | 70'''' |
| | | | Aggregate Identifier 4 | Aggregate Direction 4 ,e.g. UP | Aggregate Resources 4 | Agg Resource Type Indicator 4 | Agg Classifier 4 | Const Identifier 4 | Const Classifier 4 | Const Resources 4 | Resource Type Indicator 4 |
| | | | 62''''' | 63''''' | 64''''' | 65''''' | 66''''' | 67''''' | 68''''' | 69''''' | 70''''' |

Figure 14

MESSAGES AND CONTROL METHODS FOR CONTROLLING RESOURCE ALLOCATION AND FLOW ADMISSION CONTROL IN A MOBILE COMMUNICATIONS SYSTEM

RELATED APPLICATIONS

The present application claims the benefit of U.S. Provisional Patent Application Ser. No. 60/434,307 filed Dec. 18, 2002 entitled: "METHODS AND APPARATUS FOR PERFORMING RSVP AGGREGATION" and U.S. Provisional Patent Application Ser. No. 60/434,305 filed Dec. 18, 2002 entitled: "METHODS AND APPARATUS FOR PERFORMING RSVP SIGNAL AGGREGATION" and is a continuation-in-part of U.S. patent application Ser. No. 10/172,357 filed Jun. 14, 2002 entitled: "ENABLING FOREIGN NETWORK MULTICASTING FOR A ROAMING MOBILE NODE, IN A FOREIGN NETWORK, USING A PERSISTENT ADDRESS" which claims the benefit of U.S. Provisional Patent Application Ser. No. 60/301,069 filed Jun. 26, 2001 entitled: "METHODS AND APPARATUS FOR PERFORMING RSVP AGGREGATION".

BACKGROUND

In mobile networks, the movement of users and changes in user bandwidth requirements creates significant uncertainty as to the correct allocation of resources in a wireless access router, and on the links to and from the core network.

In traditional cellular networks this is solved by using MAC layer signaling to provide control loops for resource management both to and from the base station via the base station controller, and on through to the first IP QoS-aware device known as the Packet Data Switched Network (PDSN) in ($3^{rd}$ Generation Partnership Project 2 (3GPP2)terminology. The further the control loops extend up the network hierarchy, the longer the loops and feedback delay, resulting in less accurate control with the side-effect that either too much or too little traffic in each class may be delivered over the networks in each direction.

In a wireless network, the base station may be an IP-aware device, such as a wireless access router. In many cases, the base station is able to deliver IP Quality of Service (QoS) in both directions, both over the air to the mobile node (MN), e.g., mobile device, and over the backhaul link to the Operator Edge Router (OER). The OER is then typically connected back into the regional Point of Presence (POP) of the wireless operator and Internet Service Provider (ISP).

In any such IP-aware device, located at the edge of a dynamic network, and connected over costly access links, it is desirable to dimension the access link and wireless links at the wireless access router itself so that the wireless access router has the right amount of user traffic, of each traffic type, at any point in time, so that the air link and access link can be fully utilized and the buffering delay and packet drops in the wireless access router can be effectively managed. In effect, the buffering and queuing discipline in the wireless access router should have just enough of each class of packet for/from each user to meet the user's needs, and to compensate for the delay due to the variations in the radio channel over time, and to compensate for variations in the delay of packet delivery over the access link.

With the support of a multitude of traffic classes, such as voice, best effort data, interactive data, low loss data, etc., it is important to divide the access link bandwidth into partitions for each class. One commonly used technique for doing this is the IETF differentiated services model, as well as general hierarchical class-based schedulers such as CBQ, HFSC and Cisco CB-WFQ and CAR. Ideally, this partition should accurately reflect the actual mix of traffic flowing to avoid the situation where one user in a low priority partition ends up getting better service than a full complement of users in a higher priority partition.

It is therefore clear that it is desirable, to maximize utility and revenue, to dynamically adjust the partitions, whether class-based or diff-serv based, or based on any other partitioning technique, according to the real-time behavior of the users on each wireless access router in each direction of data transmission to/from the wireless devices.

In a mobile network based on mobile IP, incoming traffic to the home address of the MN goes via the MIP home agent where it is encapsulated and forwarded to the Care of Address of either the MN, or the MNs point of attachment known as a foreign agent (FA) or attendant. Meanwhile, outgoing traffic from a wireless access router usually goes un-encapsulated according to normal routing based on the IP destination address. In MIP reverse tunneling, the packets are instead first sent in a tunnel to the MIP Home Agent (HA). Therefore in the mobile network any control loop should be able to operate on encapsulated packets to and from the Home Agent.

In mobile IP, two foreign agents (FAs) also tunnel traffic between each other during hand-off as a result of MN movement between them. The source and destination addresses of the two tunnels are the pair of foreign agents involved in the hand-off.

These tunnels are used to forward data to the MN via the new FA, from the previous FA, and in addition, either a tunnel or a native IP route needs to be used between them to transfer MN state in a process known as Context Transfer. This hand-off traffic is again-very dynamic and generally requires low loss and low latency in the network. In a handoff, the previous FA may act like a temporary HA in that it encapsulates packets to the CoA of the MN.

In a mobile network connected to other networks, or to other systems which use different resource management techniques, there will normally be a number of interface boxes or gateways (PSTN gateways, webfarm firewalls, corporate access routers, MPLS edge devices) that act as major traffic sources and sinks for the wireless access routers. In such systems it would be beneficial to extend the control loops out to these major elements so they can affect PSTN connection admission control, resource allocation, and scheduling on these elements across the range of class-based partitions.

In summary, there is a need to be able to load or 'impedance match' the resource segments in a wireless network in terms of per-class partitioned resources, buffering and scheduler activity, in both directions, so that the communication system can dynamically take account of the significant changes in resource requirements required by each wireless access router, based on its active users. This matching should use appropriate control loops and aggregation so that ideally the longer the distance from the wireless access router, the slower the control loop. Matching the control loop distance to rate of adjusted, e.g., control loop speed, can be important for control loop stability.

The prior art for an exemplary resource signaling system known as RSVP will now be described, without loss of generality of the invention.

RSVP is typically used end to end between two nodes to book resources between those nodes in either or both directions. A Path message is sent by one node to discover the routing of packets from that node to the receiver, and to identify the characteristics of the resources on that routing, or Path. The Path message installs path state as it traverses the nodes that it visits that are running RSVP software. The receiver then replies with a reservation (RESV) message which follows the path state in the reverse direction and books the resources in those nodes for packets sent in the same direction as the Path message (i.e. in the opposite direction to the RESV message). If those resources do not exist then a RESV error is returned to the receiver that sent the RESV message.

Existing RSVP is composed of two uni-directional processes for the upstream and downstream directions. Prior art from Cable Labs for enhancing standard RSVP signaling, in a cable modem network, includes the following bi-directional modifications to RSVP over a single hop. The Cable Labs work can be applied over any link between a node and an Access Router. In a wireless based system, MN issues a Path message to the AR as well as a premature RESV for the downstream resources. The AR then issues a premature RESV for the upstream resources in response to the Path from the MN and may optionally, in addition, issue a premature Path in response to the RESV from the MN, so that the MN can forward this Path on to any nodes beyond the MN. The RESV from the MN will also cause the Correspondent Node (CN) of the MN to reply with the Path message that would normally have started the uplink resource reservation process. This Path message might subsequently cause a change in the RESV from the MN. When the Path from the MN reaches the actual CN destination, then the true RESV message will be issued back to the MN, which will modify the premature RESV sent from the AR to the MN. In this way, the reservation of resources on the link between the MN and the AR can be speeded up using bi-directional RSVP. Note that in the Cable Labs work, RSVP tunneling or RSVP Aggregation based on the Differentiated Services Code Point (DSCP), discussed next, is not considered or suggested.

FIGS. 1 and 2 illustrate two common aggregation techniques based on RSVP, known as RSVP tunneling and RSVP Aggregation. As is well known in the art, an aggregation peer exists at either end of an aggregation region, through which multiple parallel aggregates are defined between those peers. An aggregate is defined both by some definition of the packets that are members of that aggregate, called the constituent flows, as well as some proportion of the link resources shared by that aggregate, defined by some function F. The combination of the resource functions in a specific direction over the link at any point in time must be equal to the total resources associated with that link, where resources comprise both bandwidth and latency. Hence one aggregate can be assigned some portion of bandwidth and some latency bound that will be useful for VoIP traffic, whilst another aggregate can get the remaining resources and a variable latency bound for best effort traffic. The mapping between the aggregates and the constituent flows in each aggregate on a link is handled by a constituent classifier, which is communicated to the ingress Aggregation Peer, for example, using constituent resource signaling. This classifier defines the constituent packet flow and the target aggregate for that flow. Each aggregate will then have a second aggregate classifier that defines for all routers between the aggregation peers the unique identifiers for each aggregate. A typical unique identify could be a specific Differentiated Services Code Point (DSCP) value or a specific tunnel encapsulation. This aggregate classifier is communicated through the aggregation region using aggregate resource signaling, which avoids the aggregation region having to know anything about the constituent flows in an aggregate and specifically all the individual constituent classifiers. This aggregate resource signaling also includes the amount of resources assigned to the aggregate identified by the aggregate classifier. Such aggregate and constituent classifiers are henceforth referred to as aggregation classifiers.

An admission control procedure is typically undertaken at the aggregation peers whereby constituent resource signals are mapped into a specific aggregate and if necessary the resources in that aggregate adjusted based on the resource requirements of the constituent flow. If this mapping is undertaken by the egress aggregation peer then the mapping needs to be communicated to the ingress peer so that constituent flows can be uniquely marked to identify them with the assigned aggregate. If the resources for the aggregate are booked by the egress peer back to the ingress peer then the egress peer needs to know both the constituent resource requirements and the target aggregate for that constituent. Each aggregate typically has a resource threshold indicating the maximum amount of resource assigned to that aggregate, a portion of which is being employed at any point in time by the constituent flows mapped into that aggregate. This ensures that constituent resource signals and associated admission control procedures do not always result in additional aggregate resource signaling to increase/decrease aggregate resources given the change in the constituent flows. This damps and decouples the aggregate resource signaling from the constituent resource signaling.

In FIG. 1, RSVP tunneling has at least one IP-IP tunnel 501 between the two aggregation peers through which an end to end path (e2e_Path) message 504 can flow. IP-IP tunnel 501 has a tunnel path 508. Any constituent flows that are part of the tunnel 501 aggregate are mapped into that tunnel 501 at the aggregate ingress node (Rentry) 502 and deaggregated at the egress (Rexit) 503. The mapping between the constituent flow and the aggregate is communicated in a session_association object in the constituent Path message (e2e_Path+Session_assoc_Obj) 507 which is forwarded to Rexit 503. The aggregation ingress node (Rentry) 502 has a constituent classifier for each constituent flow along with the target resources for that flow and the target aggregate for that flow. The tunnel aggregate then has an aggregation classifier, which uniquely identifies the tunnel encapsulation, the constituent flows (packets) that are part of that tunnel aggregate, as well as the resources for that tunnel 501. The aggregate classifier, tunnel encapsulation, and resources are communicated to all the routers between the two aggregation peers. Any end to end resource signaling associated with a specific constituent flow can be used to increase or decrease the resources for each constituent flow, and the resources for the tunnel aggregate containing that constituent flow. The end to end (level 0) resource signaling for the constituent flow is then hidden from the intermediate routers (Rint) 506 so that they do not additionally and incorrectly modify the resources in the routers that form the tunnel 501 such as in the intermediate router (Rint) 506. This is naturally achieved by the tunnel header. Multiple parallel tunnels can be used between the same pair of aggregation peers to group constituent flows into a smaller number of aggregates that share similar resource characteristics so as to obtain statistical multiplexing gains and to reduce the resource processing and signaling load in the intermediate routers 506. The end to end (e2e) reservation (e2eResv) signal 505 is not normally forwarded into the tunnel 501 by Rexit 503 until the amount of resources additionally required by the tunnel for that end to end message 504 has been reserved by the Tunnel Resv message (Tunnel Resv+ Resv_Conf_Obj) 509 and confirmed by the Resv Confirm message (Tunnel Resv_Confirm) 510 in all routers within the tunnel 501 serving the matching aggregate. If insufficient resources are present in the tunnel 501, indicated by Tunnel ResvErr message 511, then the Rexit node 503 alternatively triggers the e2eResvErr message 512 to the end to end source of the e2e Resv message. The tunnel header for each of the parallel aggregates can be differentiated in the intermediate routers 506, to enable the correct aggregate resources to be employed, by use of either a unique User Datagram Protocol (UDP) header, a unique (IP security Protocol (IPSEC) Security Parameter Index (SPI) or a unique Differentiated Services Code Point (DSCP) in the outer header of the tunnel 501.

In FIG. 2, RSVP Aggregation is shown. This aggregation technique does not necessarily use a tunnel 501, but can simply remark the DSCP of arriving packets to show which DSCP aggregate they are a member of. The absence of a tunnel 501 between the aggregation peers means that to hide the end to end (level 0) resource signaling, that is associated with a constituent flow, from the intermediate routers (Rint) 506, the resource signaling itself must carry a parameter that informs the intermediate routers 506 that they should ignore the resource signal. This 'parameter' must be enabled at the ingress aggregation node (RAgg) 601 and disabled at the egress deaggerator node (RdAgg) 603 so that only intermediate nodes 506 are affected, and downstream nodes beyond the aggregate egress 603 can still examine the end to end resource signal. The absence of a tunnel 501 also requires the level of the aggregate to be known at both ends by other means. In RSVP, the 'parameter' is effected by changing the protocol Id, marking the router alert option with 'RSVP_end_to_end_ignore', shown in e2e_Path+ e2E_ignore Message 604, and including in the router alert option the aggregation level, so that only the deaggregating router 603 for that aggregate level demotes the resource signaling packet to the next lowest aggregate level. When the last deaggregator is reached, in a hierarchy of aggregation and deaggregation nodes, then the protocol Id will be converted back to normal RSVP and 'end_to_end_ignore' removed as shown in e2e_Path message 504. The ingress aggregation node (Ragg) 601 has resources and a constituent classifier for each constituent flow, and an aggregation classifier and resources for the DSCP aggregate that identifies the required DSCP value for that aggregate. This information is carried by the Agg Path (DSCP) message 606 and the Agg Resv message 607. If the aggregate includes a tunnel header then the tunnel encapsulation is also described by the aggregation classifier. The aggregate classifier mapping for each constituent flow is however in this case determined by the Egress Deaggregator node (RdAgg) 603 by communicating the mapping back to the Aggregator 601 in a constituent PathErr message 605, in the case of a new aggregate, or an Aggregate Resv message 607 in the case of a previously established aggregate, along with the aggregate identifier which is typically a DSCP value carried in an RSVP DCLASS object [DCLASS]. This is shown in FIG. 2 as e2e Path+New_Agg+DSCP_obj message 605 or Agg_Resv (DSCP)+Resv_Conf_obj Message 607 respectively, where the Resv_Conf object requests a confirmation of the availability of the additional aggregate resources back to the RdAgg. Once again the e2e_Resv message 505 is not forwarded back towards the RAgg 601 until the matching resources have been booked in all routers within the aggregate such as Rint 506, indicated by the receipt of the Resv_Confirm message 610. Error messages 611 and 512 are alternatively used to indicate resource reservation failure.

Existing RSVP tunneling and RSVP Aggregation support functionality to automatically discover the aggregation peers, to communicate the mappings between the aggregate and constituent flow, to communicate the resources for each aggregate, to aggregate constituent RSVP signaling into the RSVP aggregate signaling, and to then hide that signaling from the intermediate RSVP router nodes. The mappings are controlled by the aggregrate ingress node (Rentry) 502 in RSVP tunneling whilst it is controlled by the egress deaggregrator (RdAgg) node 603 in RSVP DSCP aggregation. Both techniques can use policy management techniques to configure resources and mappings into the aggregation peers for constituent flows that do not have associated resource signals. In addition, both techniques can assign what can be termed threshold resources to aggregates in advance of constituent resource signals so that aggregate resource signals are not triggered by each constituent flow resource signal event. This decoupling provides for more efficient signaling and a more stable system. Finally, both systems use the constituent flow resource signals to communicate the mapping of that constituent flow to a specific aggregate.

While the known aggregation techniques provide for the decoupling of the allocation of resources to aggregates and the assignment of flows to aggregates, the way in which these operations is done it not well suited for the dynamic nature of a mobile environment. In the known systems, aggregates flow between end nodes. Each end node controls, e.g., determines, resource allocation and assignment of flows to aggregates in a single direction. Thus, in the case where there are flows between a pair of aggregate end nodes in two different directions, e.g., bi-directional flows with packets being communicated in both an upstream and a downstream direction, different nodes end up being in control of which flows are assigned to particular upstream and downstream aggregates. In addition, in known systems one aggregate end node is responsible for determining the distribution of upstream resources among upstream aggregates and the other end node is responsible for determining the distribution of downstream resources among downstream aggregates.

The known control technique of making end nodes each responsible for controlling flow aggregation and resource allocation to aggregate packet flows in a single direction but not both, is based on the idea that different ends will be better suited to make such controlling decisions since the flows are in different directions and different ends should, presumably, be better aware of the factors which should be used in making such decisions for a given direction.

While the known aggregation techniques work adequately for many existing networks where fixed, relatively stable communications connections are used to couple end nodes to the network, they are not as well suited as may be desired for mobile networking. In the case of mobile systems, the access link between an access router and a core node represents a point which is likely to be subject to congestion due to limited resources for packet flows. This is because, generally, links further in the core have greater bandwidth capability than links further out in the network.

Demands for resources and the types of packet flows passing over the link between an access node and a core node can vary frequently based on a host of wireless link conditions and/or changes in the number and/or type of mobile terminals being serviced by the access node at any given time. This is because, for example, multiple end nodes, e.g., mobile terminals, may enter and leave a cell in a relatively short amount of time. Changes in signal interference and/or the type of data being communicated to/from mobiles can have a significant impact on the type and amount of packet traffic to be communicated over the link coupling the access node to a core node. In mobile systems, scheduling decisions in regard to scheduling uplink and/or downlink transmissions over wireless terminals can have a significant impact on not only the demand for resources on the access link coupling an access node to a core node but also on the mix of packet types and/or data packet priority levels which will be found in the packet traffic to be communicated over the end node.

Unfortunately, given communications delays that may exist between a core node and the access node to which it is connected and/or bandwidth constraints, it may not be practical to communicate all the information available at the access node in a time frame that would be particularly useful to the core node to make packet flow to aggregate assignments and/or resource to aggregate assignment decisions at the core node. Thus, if the known aggregation techniques are applied, the core node will make aggregation and resource to aggregate assignments relating to flows in one direction using information that is not the most current and/or does not reflect a fully informed decision since all the information available at the access node will normally not be available at the core node for decision making purposes.

As discussed above, in systems using MIPv4 or MIPv6, tunnels are often used to facilitate the redirection of packets to a mobile node which is attached to the network via an access router which is located outside its home domain. In such systems a tunnel for communicating IP packets to a mobile is normally established between the mobile's Home Agent (HA) and either the access router to which the mobile node is attached or the mobile node itself. Given that tunnels to a mobile node's HA extend through the core of the network, they will pass over the access link which couples the access router to which a mobile node is attached. Thus, flows of packets corresponding to a tunnel from a mobile node's HA to either the access router used to connect the mobile node to the network or to mobile node itself will be one of the flows passing over the link between the access router and core node, e.g., the first node in the core to which the access router is connected.

Management signals used to manage resource and/or allocation of packet flows to tunnels extending to a home agent may be useful in managing resources on links over which the tunnel passes. Unfortunately, the tunneling process normally results in such tunnel management signals being hidden from intermediate nodes, e.g., as a result of encapsulation. From a management standpoint, it would be desirable if tunnel management information could be made available to intermediate nodes, e.g., core nodes, which could then use the signals for flow management purposes.

In view of the above discussion, it should be apparent that there is a need for improved methods of controlling access link resources and the flow of packets between an access node, e.g., access router which serves as the point of attachment for mobile nodes, and a corresponding network node, e.g., the first core node to which a wireless access router is connected.

It is desirable that at least some new methods and/or apparatus facilitate using air link information, e.g., air link utilization information, scheduling information, current air link bandwidth, the number of mobile nodes in a cell which may use air link resources, etc., to control and/or influence the allocation of access link resources between the access node and core node. To reduce and/or eliminate control signaling requirements and/or delays it would be beneficial if, in at least some embodiments, control of access link resources be capable of being controlled primarily or at least initially from the access router for packet flows in both directions to/from the access node over the link to a core node for which resources are being allocated. In addition there is a need for improved messages and/or ways of communicating information relevant to aggregation of packet flows and/or allocation of resources over links where congestion may occur. There is also a need for, at least in some cases, methods and/or apparatus which can use information and/or control signals relating to tunnels to a mobile node's home agent when making decisions about allocating resources between links over which the tunnel or tunnels to the mobile node's home agent are routed.

SUMMARY

The present invention is directed to methods and apparatus which can be used to enhance resource allocation and utilization of access links which couple an access node, e.g., an access router which serves as the point of network attachment for multiple mobile nodes, to a core network node. The access link may be the first link between a wireless access router, which uses radio signals to communicate with mobile nodes, and other network nodes, e.g., a node which servers as a MIP Home Agent for one or more mobile nodes which are coupled to the access router.

In accordance with the invention, packet flows over the access link are mapped into aggregate flows. Access link resources are allocated to the aggregate flows. In accordance with the present invention, an access router is made primarily responsible for assignment of packet flows over the access link to particular packet flow aggregates for flows in both an upstream and downstream direction. In this case, downstream refers to flows from the core of the network to the access node. Thus, in contrast to systems where different ends of upstream and downstream aggregates control aggregation and resource assignment for flows in only a single direction, e.g., upstream or downstream, primary aggregation and resource control for both directions is placed in the access node.

In accordance with one feature of the invention, mapping of packet flows to flow aggregates is determined by the access node, e.g., in one but preferably both flow directions, as a function of air link resource information such as the number of mobile nodes using air link resources in the cell in which the access node is located, air link scheduling information, the type of information being communicated between mobiles and the access node such as voice, data, etc. Admission control events at the access node are used in some embodiments to trigger adjustments in assignments of flows to packet flow aggregates and/or the allocation of resources to packet flow aggregates.

The invention includes support for constituent flows over the access link which are themselves tunnel aggregates between a tunnel node such as a MIP Home Agent, and either the MN or the AR. Each tunnel aggregate is then mapped into a specific access link aggregate, and associated resources, over the access link and in so doing create an aggregation hierarchy. Each tunnel aggregate contains a different group of packets directed to/from the MNs at the AR that are registered with that Home Agent, as well as a matching set of tunnel aggregate resources and hence can support a different quality of service for each group of packets. The tunnel aggregate endpoints, which are the HA and either the AR or MN, use resource allocation information which indicates the resources assigned for each aggregate as well as the classifiers that identify which MN packets are directed into each aggregate. The MN and AR therefore are able to determine these classifiers and distribute them to the HA. These classifiers can include the description for the tunnel aggregate header, and in a specific embodiment can be the same as the header employed by the access link aggregate into which the tunnel aggregate is to be included as a constituent flow. The resources for the tunnel aggregate can be signaled to the HA by the MN or AR but in a further embodiment the tunnel aggregate resource signaling to the HA can replaced by the equivalent resources being signaled by the AR to the APR (OER) for the access aggregate into which the tunnel aggregate is mapped. This assumes that the network between the APR (OER) and the HA is resource rich which is generally a good assumption in core networks. The access link signaling is usually shorter and faster than the tunnel aggregate signaling, and therefore the efficiency and speed of the resource signaling for the system is improved by minimizing the use of the optional tunnel aggregate signaling. One problem still remains however and that is that admission control and resource request events that are carried in signaling packets within the tunnel aggregates, will not be seen by the APR(OER), nor the AR in the case of the tunnel terminating on the MN, and therefore will not affect the access link aggregate resources in a timely manner. Therefore, the HA aggregates such resource events and sends them to the AR and APR(OER) in the tunnel aggregate resource signals which can be seen by both of them. Alternatively, the tunneled resource signals can be put into a special tunnel aggregate which both the AR and APR are configured to inspect, or finally the MN and/or AR can signal the resource signals to the AR and the APR once the signals are decapsulated from the tunnel.

The invention also includes a set of generalized messages and parameters that can be used to configure constituent flow, tunnel aggregate and access link aggregate classifiers and header formats, as well as associated resources. These generalized messages could be incorporated within an IP signaling protocol such as RSVP for example. The messages include concurrent support for both upstream and downstream packet flow directions so that a single message from the AR can efficiently adjust the mappings between constituent and aggregate flows, and/or the associated resources, in both directions at the APR. Different types of resource adjustments can be made including absolute and relative adjustments to a specific aggregate, the swapping of resources between aggregates, and also the carriage of a set of pre-programmed weights and an associated amount of access link resources, e.g., a total amount, to the APR, which the APR can use with an optimization routine to calculate the current assignment of weights to aggregates. Subsequent adjustments can then be made by periodically sending the new resource value, e.g., new total resource value, and occasionally updating the weights for the optimization routine. In a further inventive step, the aggregates can be given identifiers associated with the aggregate classifier/header format so that the less complex identifier can be sent in each signaling update instead of a more complex identifier. The signaling further provides capabilities for the APR to acknowledge receipt of signals, and also to inform the AR of its local adjustments to either resources or routine weights based on local constraints. The APR can also inform the AR of a proactive downstream admission event at the APR for a constituent flow, when the associated aggregated or an associated aggregate has sufficient unassigned resources for that new constituent flow. The signaling enables the adjustment of resources and the configuration of aggregates and constituent flow classifiers to occur together in the same signaling packet for efficiency and latency reasons. The generalized signaling messages can also be used with the HA to configure and control the tunnel aggregates, whether or not tunnel aggregate resources signals are required.

Information regarding resource allocation and information indicating flows which are to be assigned to particular flow aggregates is communicated from the access node to the aggregation peer node, e.g., the core node at the other end of the link over which the flows are being aggregated. The aggregation peer node uses this information to admit flows and to assign resources to admitted flows for the downstream direction.

In accordance with the invention, a control loop is placed in both directions over an access link, e.g., a link between a wireless access router and another network node, and is operated in conjunction with additional control loops back into the core network. The longer the control loop, the slower should be the aggregation partition changes to avoid instability. In some IP embodiments, each control loop is implemented using an IP signaling protocol to be able it to correctly carry the semantics and syntax of IP QoS control. In addition, to enable the short fast control loops to, in turn, affect over slower timescales the longer term partitioning over longer distances, the IP signaling protocol implemented in accordance with some embodiment of the invention supports multiple layers of hierarchy and information aggregation. In accordance with one exemplary embodiment of the invention, the control loop protocol selected is the IETF standard RSVP with novel inventive aggregation extensions, and a number of other specific operational changes used in accordance with the invention to address the discussed control problem.

In standard RSVP, each originator independently issues 'advice' via a Path message as to what will be sent forward but leaves the receiver of the Path message to decide what resources should actually be reserved. The path message can pick-up information (Adspec) on its path through intermediate routers to provide additional information to the receiver as to the required reservation to make in the RESV message sent back to the sender of the Path message.

In accordance with a first feature of the invention, to provide a bidirectional reservation between a pair of nodes, each pair of nodes independently issues Path messages to trigger RESV messages.

Secondly, in bidirectional RSVP as modified to in accordance with the invention, a sender can alternatively issue a single path message that can install a bidirectional reservation for the downlink interface at the remote node back to the sender, as well as on the outgoing interface of the originating node towards the RSVP message receiver. The message receiver can in addition originate a path message back to the sender to mirror normal RSVP message exchanges by triggering the RESV back from the sender.

Various other aspects of the invention are directed to a range of traffic engineering extensions that are to be added to existing RSVP to enable RSVP to perform traffic engineering on core links for MPLS for example. Extensions added by the invention can be used to communicate and/or achieve reliable, fast, and efficient RSVP state changes in a communication system.

In addition, in accordance with some embodiments of the invention, RSVP aggregation is used to enable multiple layers of RSVP to aggregate the RSVP messaging from a lower layer aggregate, (e.g.) between two RSVP nodes on the path of that aggregate, thereby enabling a small number of RSVP exchanges at that level to represent the multitude of finer granularity RSVP messages at the layer below, so that RSVP nodes between the aggregating/de-aggregating nodes have far fewer RSVP messages to communicate and process than in implementations using standard RSVP, leading to higher reservation performance. At each layer of aggregation, the size of the resources being booked normally grows, as the finer details of the lower layer reservations are increasingly hidden.

In accordance with the various features of the present invention, one or more of the following will occur, e.g., be performed in a system implementing the invention:

1) A backhaul link in each direction will be divided into 'class based' and/or 'diff-serv based' bandwidth partitions of appropriate sizes given the nominal average requirements of the wireless access routers in the network for the planned traffic matrix.

2) A wireless access router (AR), will periodically issue a PATH message towards the OER representing the instantaneous aggregate requirements of itself and its connected senders for per partition resources on the backhaul uplink to the OER. The OER will, in at least some cases, respond to this path message with an equivalent reservation for the signaled partition resources as the access router is best placed to make the decision on the partition requirements given its proximity to the air link. Thus, in some cases the OER is effectively slaved to the wireless access router. In such cases, the access router can, and often does use user profiles, short term historical bandwidth usage, pending uplink slot requests, class based queue status, number of MNs in the cell and application session requests pending, outstanding and transport layer effects for instance. For example, one simple method would be that the partitions should maintain the differentiation per user between each of the classes. In some implementations, in circumstances whereby the sum of each of the PATH messages from ARs for a partition are greater than its access link capabilities, but not at other times, the OER attempts to modify the RESV messages proportionally below the requested PATH message. The method for partition allocation in the OER, in some embodiments, shares the behavior of the method in the wireless access router so that the OER can cooperate fairly across partition requests, to maximize use of resources and fairness in each class/partition.

3) The OER normally passes the AR RSVP PATH messages onward towards the core of a network, and/or can in addition act as an aggregator to aggregate multiple path messages towards a distant de-aggregation point. The rules between multiple OERs and their upstream node may be similar to the above described AR-OER relationship used in some embodiments of the invention.

4) In various embodiments the OER periodically issues a PATH message to the AR representing the OER's nominal partition configuration for the backhaul downlink. The AR responds by using its better information regarding the traffic dynamics and calculates a modified partition allocation per class for the RESV message that is used to configure the OER downlink interface. The inputs to this AR process include, e.g., an link utilization information. The OER path message can be part of or be modified by incoming path messages from the core.

5) The AR, in some embodiments, uses bidirectional RSVP to integrate proceeding features 2 and 4 so that the AR can use a single path message to book resources in both directions and later receive and make modifications to these bookings following reception of incoming path and reservation messages from the core.

6) In some embodiments RSVP refresh timers are accelerated, as compared to known systems, to be able to keep pace with the radio-related traffic dynamics yet are, in some cases, damped to maintain stable control. In some implementations, system partitions are designed to have maximum deviations away from the mean value defined to assist with stability.

7) Novel RSVP extensions of the invention may and often are used to increase reliability and refresh efficiency and to increase control loop utility in an efficient manner.

8) The backhaul control loop is able, in various embodiments, to respond to per-flow RSVP reservations either from the core or the MNs. These messages are viewed as being aggregated into one or more RSVP partition requests.

9) Longer length control loops are formed, in some implementations, by aggregating OER messages into one or more higher aggregates directed towards the core, and so on up the network, e.g., until the aggregates hit MultiProtocol Label Switching (MPLS) edge nodes. At these nodes, final aggregate messaging can, and sometimes is, tunneled through the associated MPLS Label Switched Paths (LSPs), but can and sometimes is, in addition, communicated with MPLS RSVP based traffic engineering capable nodes to flex the dimensioning (amount of resource) of the diff-serv based LSPs.

10) Higher aggregates may include aggregation peers at equivalent levels of hierarchy in peer networks through an MPLS core, as well as PSTN gateways, corporate access routers and web farm access routers. Higher aggregates are further from the edge dynamics, and may include large numbers of flows so the degree and speed of dynamics can and should be much slower then elsewhere in the system.

11) In the downlink direction, for encapsulated traffic from the Home Agent (HA), per-flow RSVP messages are encapsulated in some implementations thereby hiding them from the OER. In some implementations which operate in this manner, the HA includes an RSVP aggregation function that produces aggregate RSVP messages that can be processed by the OER. In such systems the wireless access router normally acts as a de-aggregator that generates the RESV messages for the OER. In addition or instead of this, a HA can transfer the DSCP of an encapsulated packet into an outer message header and then have the OER simply use DSCP densities to modify aggregate RSVP messages and partition size requests. The reverse may happen in the case of reverse MIP tunneling.

Various methods and apparatus of the present invention, as well as additional features of the invention will be discussed in the detailed description which follows.

BRIEF DESCRIPTION OF THE DRAWINGS

FIG. 14 illustrates an exemplary message implemented in accordance with the present invention.

DETAILED DESCRIPTION

Figure 1:
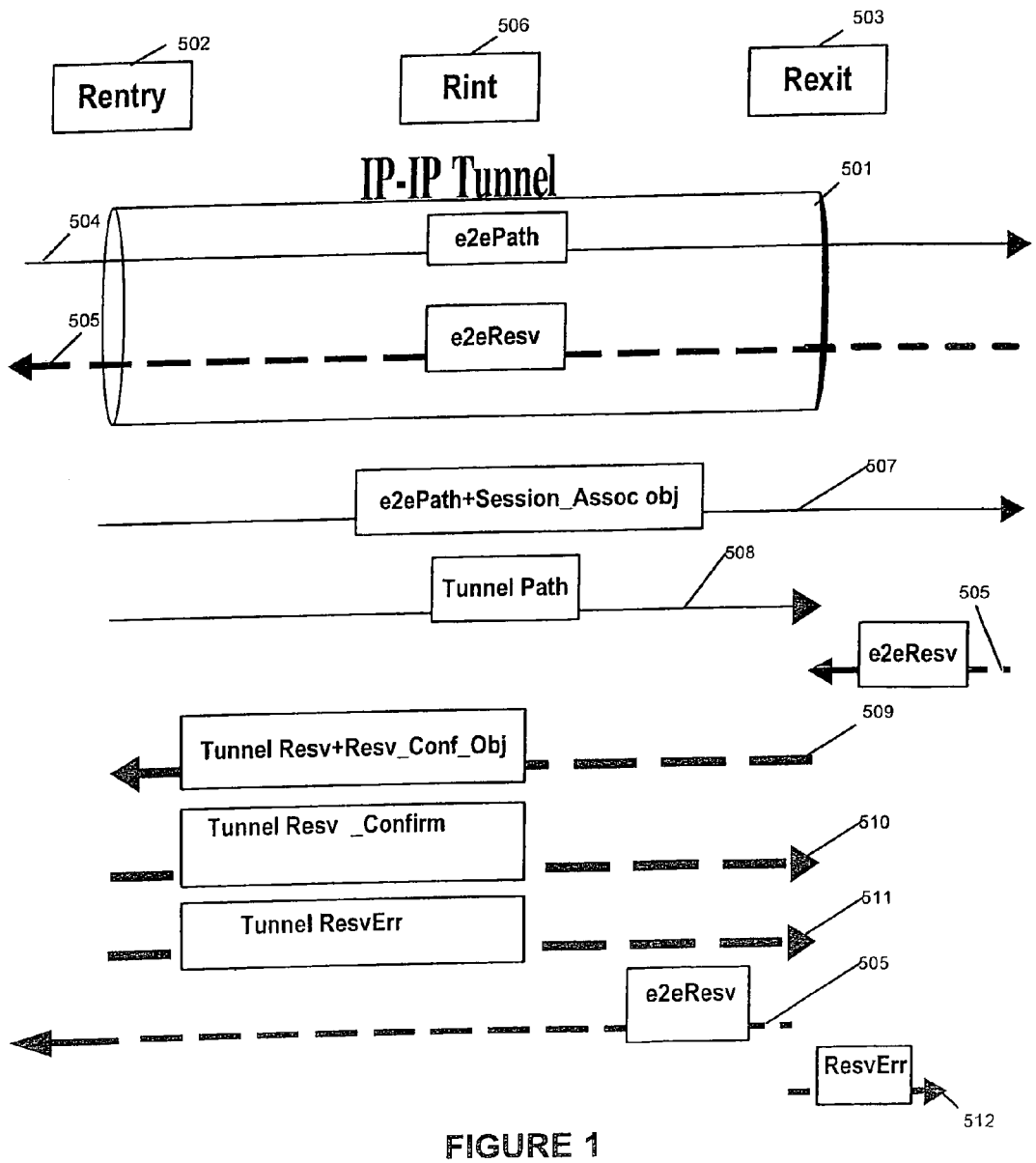
FIG. 1 illustrates existing RSVP tunneling techniques.
Figure 2:
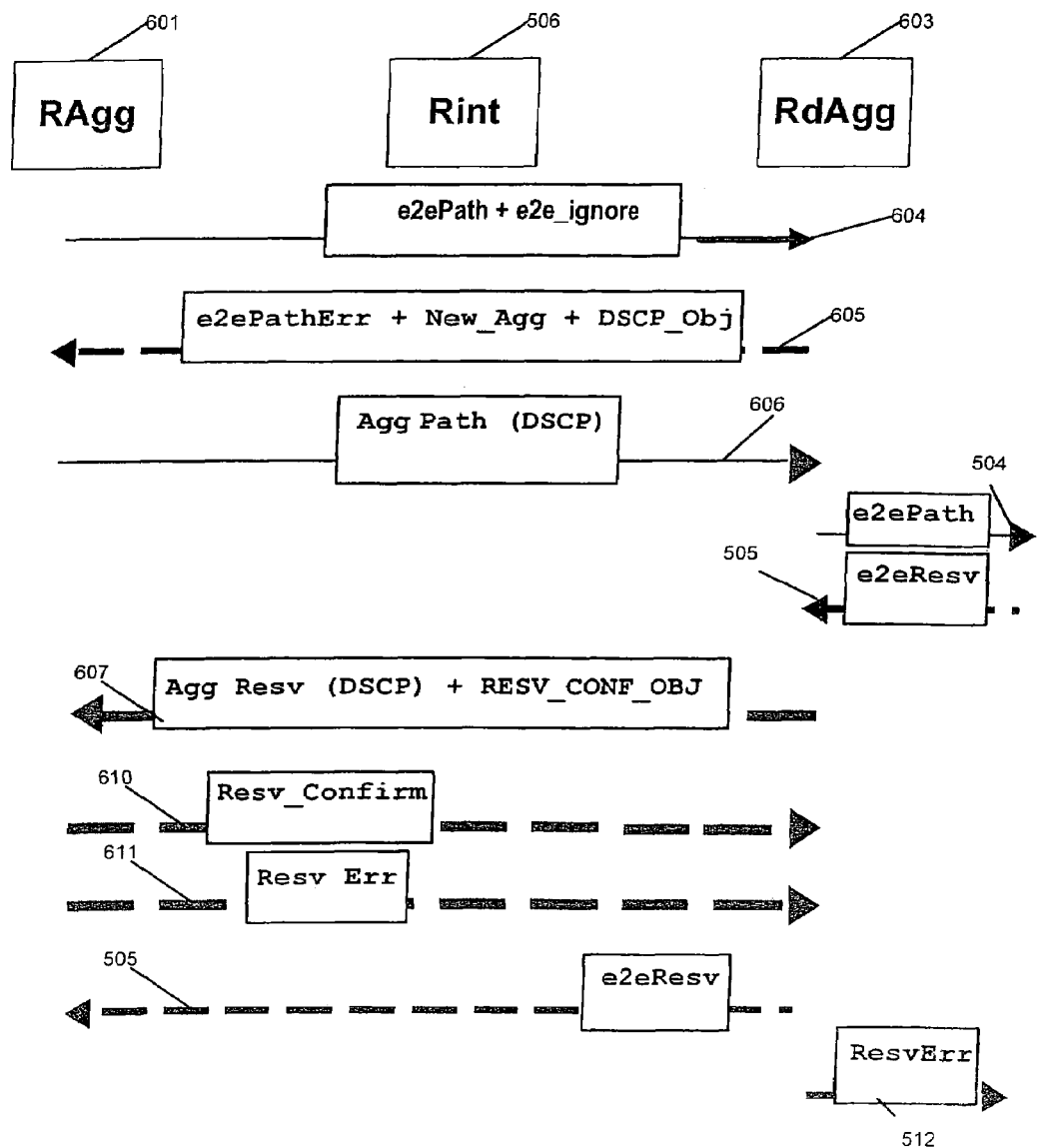
FIG. 2 illustrates existing RSVP Aggregation techniques.

The present invention relates to communications sessions and packet forwarding and, more particularly to methods and apparatus for enabling various packet flow aggregation and resource signaling techniques to be employed to enhance the management of resources available to mobile nodes for said communications sessions. In particular, the aggregation and signaling techniques are designed to enable the available resources to be adjusted in sympathy with the high dynamics typical of the radio environment both due to mobile node movement, session changes and radio channel effects. The aggregation techniques can be deployed at multiple levels of aggregation hierarchy and between a range of network node peers.

Various aspects of the present invention are directed to novel methods, apparatus and data structures for enabling an Access Node to rapidly and efficiently adjust the resources available to traffic aggregates over the access link in sympathy with the admission control, hand-off and radio channel capacity changes in that Access Node. This is achieved by the Access Node coupling the basestation events into the traffic aggregate management and then efficiently signaling resource changes for uplink and/or downlink directions to its peer, the Access Aggregation Node.

The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the following disclosed methods, apparatus and data structures and any other patentable subject matter and embodiments made obvious by the text of this application.

Various terms used in the present application will now be explained so that they can be properly interpreted in the description which follows.

Mobile Node: A host or router that can change its point of attachment from one network or sub-network to another.

Mobile nodes may have some or all of the following attributes. A mobile node may change its location without changing its IP address; it may continue to communicate with other Internet nodes at any location using its (constant or persistent) IP address (known as the global home address or global HoA), assuming link-layer connectivity to a point of attachment is available. In various embodiments a mobile node is given a long-term (or persistent) (e.g., IP) home address from a global Home Agent on a home network, and a medium term local HoA henceforth called a regional address (RoA) from the local HA in the local network. Either home address may be administered in the same way as a "permanent" IP address is provided to a stationary host. When away from its home network, a "care-of address" is associated with the mobile node Home Address in the global HA that is the regional address. Similarly, a care of address is associated with the regional address in the local HA that is related to the mobile node's current point of attachment at an Access Node, called its location.

Access Node: A node that serves as a network attachment point for one or more mobile nodes. The access node may have wireless interfaces and support hand-off to enable a mobile node to rapidly and efficiently change Access Nodes. Access Nodes are typically Access Routers with wireless interfaces.

Cell: The area of wireless coverage resulting from radio propagation and system limits that extends out from a radio antenna or antennas on an access node, e.g., base station.

Session: A communication relationship that typically involves a bi-directional flow of packets between a mobile node and at least one correspondent node.

Session Peer: A peer with which a network node, e.g., a mobile node, has a negotiated session. Session peers can be mobile or stationary. The phrase correspondent node is used interchangeably to refer to a session peer.

Link: A facility or medium over which nodes can communicate at the link layer. A link underlies the network layer.

Link-Layer Address: An address used to identify an endpoint of some communication over a physical link. Typically, the Link-Layer address is an interface's Media Access Control (MAC) address. The mapping between link-layer addresses and IP addresses is typically maintained by the Address Resolution Protocol.

Network Node: A network element that serves as a forwarding device. A router is an example of one type of network node.

Aggregation Peers: Aggregation peers are the end-points for a traffic aggregate whose resources are managed using signals that typically originate and terminate on those peers, forming a resource management control loop.

Aggregation Peer Node: This is the Aggregation Peer of the Access Node for the traffic aggregate.

Tunneling Node: This is a node that encapsulates and decapsulates messages into/out of an encapsulation header that has a source address/destination address equal to that of the Tunneling Node.

Figure 3:
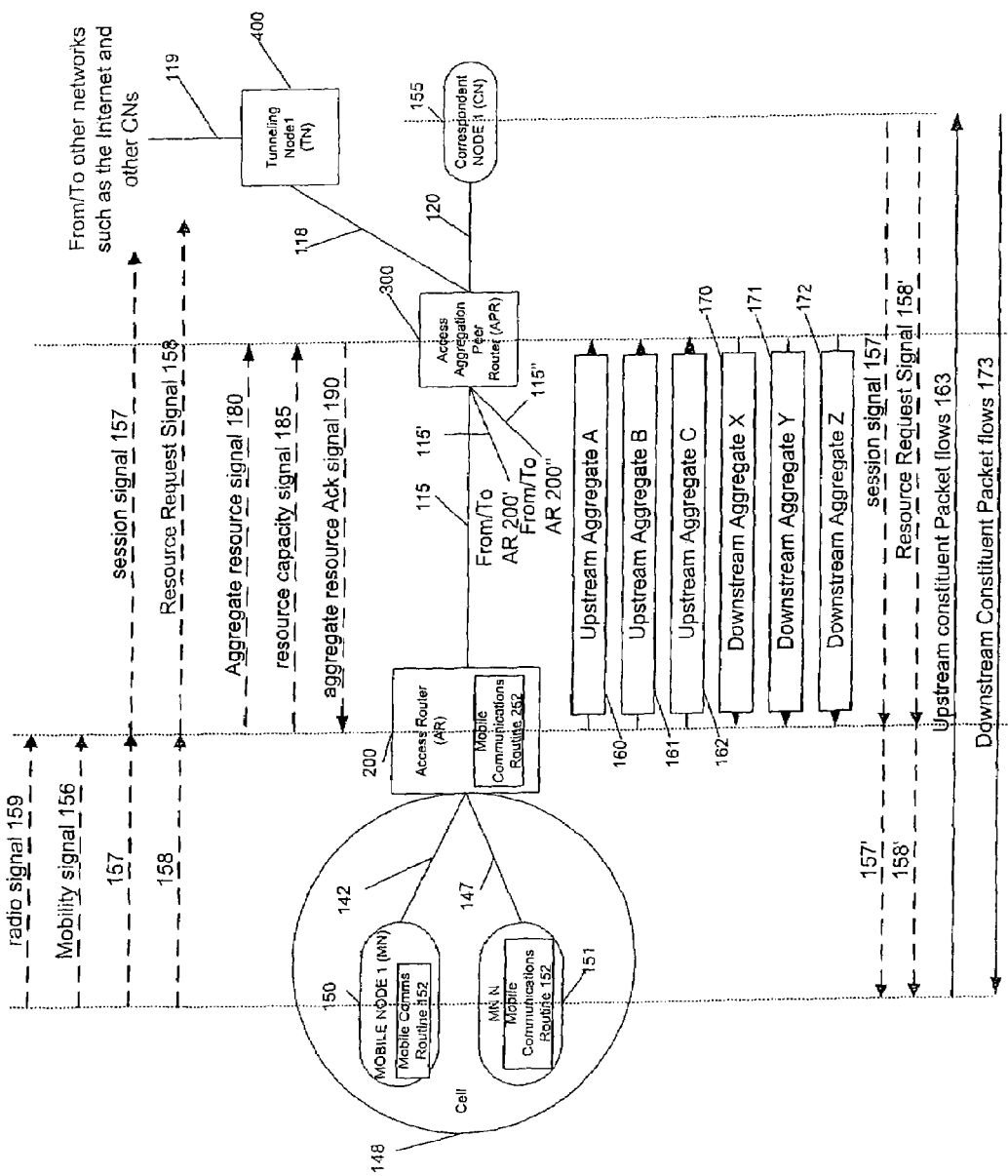
FIG. 3 illustrates an exemplary communications system implemented in accordance with the present invention.

FIG. 3 illustrates an exemplary communications system 100 implemented in accordance with the methods and apparatus of the present invention. The system 100 includes cell 148, which is coupled to an Access Router Node (AR)

200. The cell 148 includes a plurality of Mobile Nodes (MNs), MN 1 150, MN N 151 which are coupled to the Access Router 200 via wireless links 142 and 147, respectively. The Access Router 200 is coupled to an Access Aggregation Peer (Router) Node (APR) 300 via an access link 115. System 100 may include a plurality of access nodes and cells. Similar links 115', 115" are used to couple other similar or identical Access Routers 200'/cell 148', 200"/cell 148" combinations to the Access Aggregation Peer Node 300. Access Aggregation Peer Node (APR) 300 is further coupled to a Correspondent Node (CN) 155 via a link 120. Access Aggregation Peer Node (APR) 300 is further coupled to other similar or identical Correspondent Nodes 155 located in other networks such as the Internet via link 118, through a tunneling node 400, and then via link 119. The tunneling node 400 is located between links 118 and 119 and manages tunnels between itself and the Access Router 200, or between itself and the MNs 150, 151. The tunneling node 400, may without loss of generality, be collocated with a CN such as, for example, CN 155, another AR such as AR 200' (not shown) or another MN, for example, MN 150', 151' (not shown), and the tunneling may be controlled by mobility signaling such as Mobile IP version 4 or version 6.

The Access Router 200 will typically be undertaking session admission control procedures based on SIP, RSVP and MN wireless events such as hand-off, becoming active and becoming inactive (eg sleep, powered Off). Different SIP/RSVP sessions may require and use different types of class of service over the access and wireless link. In addition, different MNs, and different data flows to and from MNs may themselves require different types of class of service support. These activities will typically affect the desired scheduling behavior over the wireless links 142, 147 and should also affect the class of service of packets over the access link 115. Therefore upstream constituent flows 163 and downstream constituent flows 173 from and to the MNs 150, 151 will consist of a plurality of best effort flows, pre-provisioned flows with differentiated services packet markings and associated performance targets, as well as constituent flows with negotiated bandwidth and latency requirements which have been agreed with the Access Node 200 using session and resource signaling. The mix of the various types of packet flows to any specific MN is constantly changing, as is the presence of a MN 150, 151 in the particular cell 148. Therefore, as MNs join and leave the cell, commence best effort or pre-provisioned packet flows, or even signal resource and session requests for specific packet flows, so the access node needs to match these demands against both the available radio and access link resources, according to the relative and absolute quality of service profiles of the MNs in the cell 148.

Both the wireless link 142, 147 and the access link 115 are expensive bandwidth and are typically congested with packets to maximally utilize those resources. In addition, the wireless link 142, 147 channel capacity between the Access Node 200 and each MN 150, 151 in each direction fluctuates as a result of known wireless communication effects specifically including interference effects as well as the distance from the base station to/from the MN 150, 151. Over some measurement interval, the Access Node 200 sees a total downlink and a total uplink capacity with connected MNs 150, 151 that varies over time. As a result there is a dynamic bandwidth mismatch between the wireless links 142, 147 and the access link 115 that is compensated for using buffering in the Access Node 200. The wide range of fluctuations and the effect of large buffers on applications does however make pure buffering solutions impractical. In addition, it is important to ensure under congestion in the downlink direction that the right kind of packets are available at the Access Node 200 for scheduling to MNs 150, 151 to maximize the utility of the system 100. There is therefore a need to control both the effective bandwidth of the access link 115 and the packet arrival mix at the Access Node 200, in sympathy with the wireless link radio channel effects, the buffer fill in the Access Node 200, the packet schedulers short term requirements, and the constituent flows involving the MN 150 and the Access Node 200 over the wireless link 142.

FIG. 3 shows a mobility signal 156 which communicates MN arrival, departure and operation changes to the access node 200. Signal 157 communicates session arrival, cessation and hold events to the access node 200 which are translated into resource demands by the access node 200, whilst the session signals may or may not be forwarded on towards peer nodes such as CN 155. Signal 158 shows a resource request signal used by the MN 150 to requests resources at the access node 200 for the access link 115 and radio link 142. The resource signal, such as RSVP, may be forwarded on towards peer nodes such as CN 155, and be further processed by intermediate nodes with resource management features. Signals 157 and 158 may also be generated by peer nodes such as CN 155 and be directed towards the MN 150 via the access node 200 as signals 157' and 158'. Signal 159 represents various radio signals used by the access node 200 to determine the capacity from each MN 150, 151 to the access node 200, and from the access node 200 to each MN 150, 151, so that the Access Node 200 can determine instantaneous and moving average air-link capacity against which the access node scheduler can scheduler packet delivery events from MN 150 to Access Node 200 and Access Node 200 to MN 150. The MNs 150, 151 include a Mobile Communications Routine 152 which is used to issue signals 156, 157, 158 and 159 to the access node 200. The access node 200 also has a Mobile Communications Routine 252 which is used to receive these signals and to process them in accordance with the invention by storing information and passing control to an admission control routine 217 and an access aggregation routine 215 shown in FIG. 4.

Packets are directed from Correspondent Nodes (CNs), located anywhere in the network shown, such as the CN 155 on link 120, or in other networks such as the Internet, towards the address of the MN 150. Such packets including downstream constituent flows 173 will reach the APR node 300, traverse the link 115 to the Access Router 200, and be delivered to the MN 150. Similarly, packets such as upstream constituent flow 163 are directed from MN 150, located in cell 148, towards the address of CN 155, which will be forwarded to the Access Router 200, over the access link 115 to the APR node 300, and onto the CN 155 via link 120.

The resources of the access link 115 are therefore consumed by downstream packets towards MNs 150, 151 and by upstream packets from MNs 150, 151. To provide quality of service capabilities over the access link 115, it can, and in various embodiments is, divided into multiple parallel aggregates in each direction, such as upstream aggregates A 160, B 161, C 162 and downstream aggregates X 170, Y 171, Z 172. Radio and IP session admission control effects known at the Access Router 200 should be input into the mapping between constituent flows and the aggregates, as well as the resources assigned to each aggregate to achieve maximum system performance. In addition, the total size of the downlink resources should be flexed in response to the radio effects known at the Access Router 200 to avoid the Access Router 200 buffers being swamped when the downlink cell capacity reduces to significant fractions of the access link 115 capacity. Finally, the uplink demands may be, and in accordance with the invention are, communicated to the APR 300 so it can calculate impact on scheduling on the upstream interface towards the CNs, for example, CN 155. The access aggregates 160, 161, 162, 170, 171, and 172, between the Access Node 200 and the Access Aggregation Node 300 and their constituent flows 163, 173, are managed using aggregate resource signals 180, resource capacity signals 185 and aggregate resource acknowledgement signals 190 which are shown in FIG. 3, and may for example be based on the RSVP protocol with suitable inventive enhancements.

Figure 4:
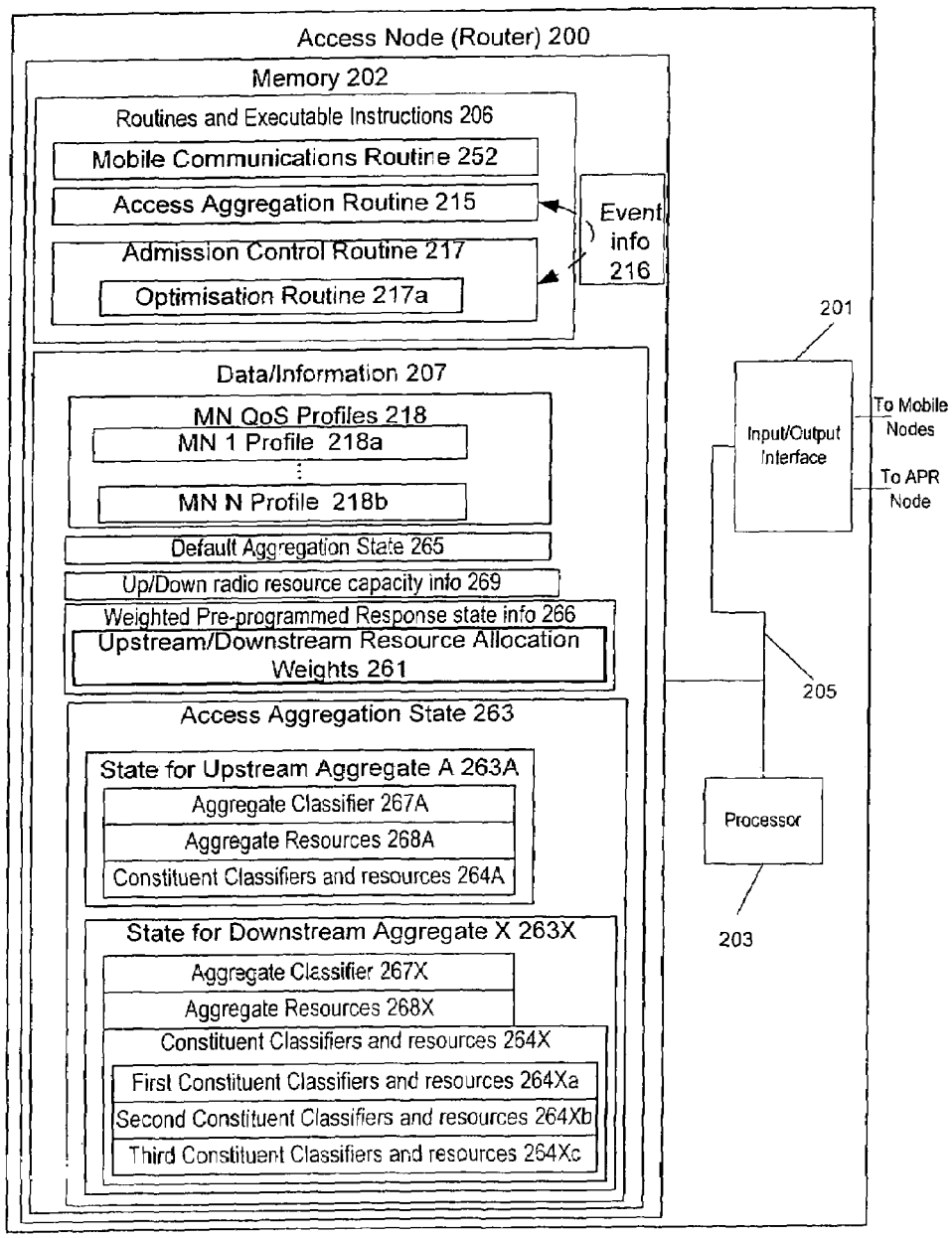
FIG. 4 illustrates an exemplary access node implemented in accordance with the present invention.

FIG. 4 illustrates an exemplary access node 200, e.g., an access router, in accordance with the invention. The access router 200 includes a memory 202, a processor 203 and an input output interface 201, coupled together by a bus 205 over which the various elements may interchange data and information. The memory 202 includes routines and executable instructions 206 executed by the processor 203 to support communications with nodes such as Mobile Node 150 and aggregation peer node 300. Routines 206 include a mobile communications routine 252, an access aggregation routine 215, and an admission control routine 217. When the mobile nodes 150, 151 are coupled to the access node 200 via wireless links 142, 147 then the input output interface 201 includes transmitter and receiver circuitry. In accordance with one feature of the invention, the Access Router (AR) 200 is placed in control of the aggregation classifiers and associated resources for both aggregation directions over the access link 115. The admission control routine 217 includes an optimization routine 217*a*. The optimization routine is used to resolve the resource conflicts between the resource demands of the MNs 150, 151, and the available capacity on the access link 115 and the air-links 142, 147. In particular, the optimization routine 217*a* is responsible for calculating the required resources for each access link aggregate given the constituent flows in that and other aggregates on the access link. Signals 156, 157, 158 that are processed by the mobile communications routine 252 are passed to the admission control routine 217 as admission control requests which triggers the optimization routine 217*a* to determine the appropriate access link aggregate 160, 161, 162, 170, 171, and 172 for the associated packet flows for that MN 150, 151 issuing that signal. Radio signal 159 advertises capacity on the air-link to the admission control routine 217 and is again passed to the optimization routine 217*a* which recalculates the resources per aggregate in sympathy with the available capacity to each MN and the aggregate resources assigned to that MN. Admission control events 216 are in either case passed between the admission control routine 217 and the access aggregation routine 215 to cause the access aggregation routine 215 to reconfigure local access aggregate state and to signal aggregate changes to the access aggregation peer node 300. In addition, admission control events 216 will be generated by the aggregation routine 215 either as a result of aggregate admissions or failure signals received from the access aggregation peer node 300.

The access router 200 includes in memory 202 data and information 207 which includes a plurality of MN Quality of Service profiles 218, for MN1 150 MN1 profile 218*a* and for MN N 151 MN N profile 218*b*. Each profile 218*a*, 218*b* provides information into the optimization routine 217*a* so that demands across competing MNs 150, 151 can be balanced in-line with the agreed MN profiles 218*a*, 218*b*. This information can include absolute bandwidth and latency targets with associated levels of assurance of availability of that bandwidth over some measurement interval, relative bandwidth and latency targets, relative priority levels between different MNs and between different types of application flows. The data/information 207 further includes default aggregation state 265 that identifies the address of each Aggregation Peer Router node (APR) 300 with that AR 200, and the default constituent and aggregate classifiers and associated resources for those aggregation peers and aggregates with those peers. This information further includes a value describing an amount of resource above the required resource that may be assigned in advance to an access aggregate for future admission control events. The data/information 207 then also includes Up/Down radio resource capacity information 269 that is determined from measurements and historical (trend) information. Data/information 207 also includes weighted pre-programmed response state information 266 including upstream/downstream resource allocation weights 261. Weighted pre-programmed response state information 266 also includes information describing a weighted pre-programmed response method with weights 261 that controls the method response in the access node 200 across each of the aggregates as the capacity over the air-link fluctuates. The weighted pre-programmed response state information 266 has weights 261 that are adjusted by the optimization routine 217*a*, said weights 261 also can be communicated to the APR 300 using resource capacity signal message 185. Data/information 207 also includes access aggregation state information 263. When the AR 200 first boots up, the default aggregates are configured with the aggregation peers by the AR 200 using the default downstream and upstream aggregation state 265 to appropriately control the exchange, installation and activation of the Upstream and downstream constituent classifiers and resources 264A, 264X, the aggregate classifiers 267A, 267X and the associated upstream and downstream aggregate resources 268A, 268X, in the AR200. This default state is then modified as admission control events 216 are received from the MNs 150, 151, as radio capacity measurements are taken, and aggregate signals are received from the aggregation peer.

Note that multiple constituent classifiers and resources will generally map to each aggregate such as a first constituent classifiers and resources 264Xa, a second constituent classifiers and resources 264Xb and a third constituent classifiers and resources 264Xc mapping into aggregate classifier 267X with aggregate resources 268X. Note also that any such constituent classifier can itself be an aggregate built between the Tunnel Node 400 and either the MN or the Access Router 200. Similarly, constituent classifiers and resources 264A may include multiple constituent classifiers and resources.

Access Aggregation state 263 may also include addition state for upstream and downstream aggregates such as state for upstream aggregate B, state for upstream aggregate C, state for downstream aggregate Y, and state for downstream aggregate Z.

Figure 5:
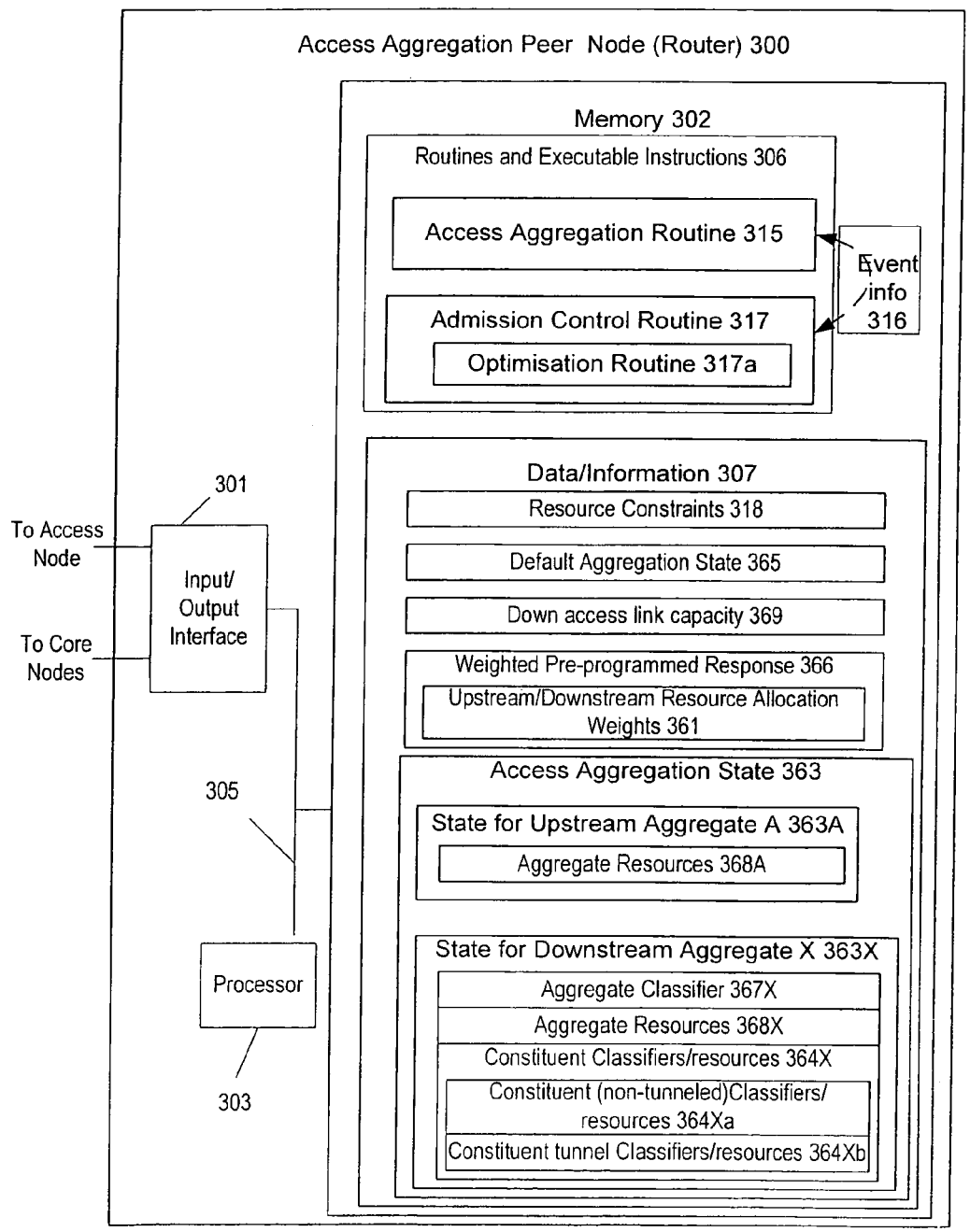
FIG. 5 illustrates an exemplary access aggregation peer node in accordance with the present invention.

An exemplary access aggregation peer node 300, e.g., an access aggregation peer router (APR), in accordance with the invention, is shown in FIG. 5. The APR 300 includes a memory 302, a processor 303 and an input/output interface 301, coupled together by a bus 305 over which the various elements may interchange data and information. Input/output interface 301 provides an interface for coupling APR 300 to other nodes such as access nodes and core nodes. The memory 302 includes routines and executable instructions 306 executed by the processor 303 to support communications with nodes such as core nodes and the access node 200. Memory 302 also includes admission control events 316 and data/information 307. Routines 306 include an access aggregation routine 315 and an admission control routine 317. Data/information 307 includes resource constraints information 318, default aggregation state information 365, down access link capacity information 369, weighted pr-programmed response information 366 including upstream/downstream resource allocation weights 361, and access aggregate state information 363. Access aggregate state information 363 includes state for upstream aggregates A 363A and state for downstream aggregate X 363X. Access aggregate state information 363 may include additional state information such as state for upstream aggregate B, state for upstream aggregate C, state for downstream aggregate Y, and state for downstream aggregate Z. State for downstream aggregate X 363X includes aggregate classifier information 367X, aggregate resources 368X, and constituent classifiers/resources 364X. Constituent classifiers/resources 364X includes a maintained record of the current downstream constituent classifiers and resources for non tunneled constituents 364Xa and a record of the current downstream constituents for tunnel classifiers/resources 364Xb. Constituent tunnel classifiers/resources 364Xb are generated by the Tunnel Node 400. These constituents 364Xa and 364b are mapped the downstream aggregate resources 368X, and the downstream aggregate classifiers 367X. State for upstream aggregate A 363 A includes aggregate resource 368A. The APR 300 only needs to keep a record of the uplink aggregate resources 368A, to compare against and maintain within resource constraints 318, because the uplink admissions are made by the access node 200 which is where the uplink constituent classifiers, resources and aggregate classifiers are known. The access aggregation routine 315 manages the access link aggregates in conjunction with the access node 200 using the default aggregation state 365 and the aggregation signals 180, 185 and 190. The admission control routine 317 checks admissions made by the access node 200 for the uplink and downlink against resource constraints 318 in data/information 307 at the APR 300. These resource constraints 318 indicate resources limits within the APR 300 itself, or on its interfaces with the core network that apply across each of the access nodes 200, 200', 200" connected to that APR 300. These resource constraints 318 can include limits on the sum of resources assigned to uplink and downlink access aggregates of specific types with access nodes 200, 200', 200". The admission control routine 317 also tracks admissions made by the APR300 for the downlink as a result of resource signals received from the core network. Such admission generate events 316 to the aggregation routine 315 whilst the aggregation routine 315 generates events 316 to the admission control routine 317 as a result of aggregation signals received from the access node 200. The APR 300 uses the downlink capacity 369 communicated to it by the access node 200 to enable it to perform such admissions. The optimization routine 317a uses the weighted pre-programmed response state 366 including the weights 361 in conjunction with the downlink capacity 369 to dynamically rebalance access link resources across aggregates for a given load in each aggregate as indicated by constituent classifiers and resources 364X and current aggregate resources 368X.

Figure 6:
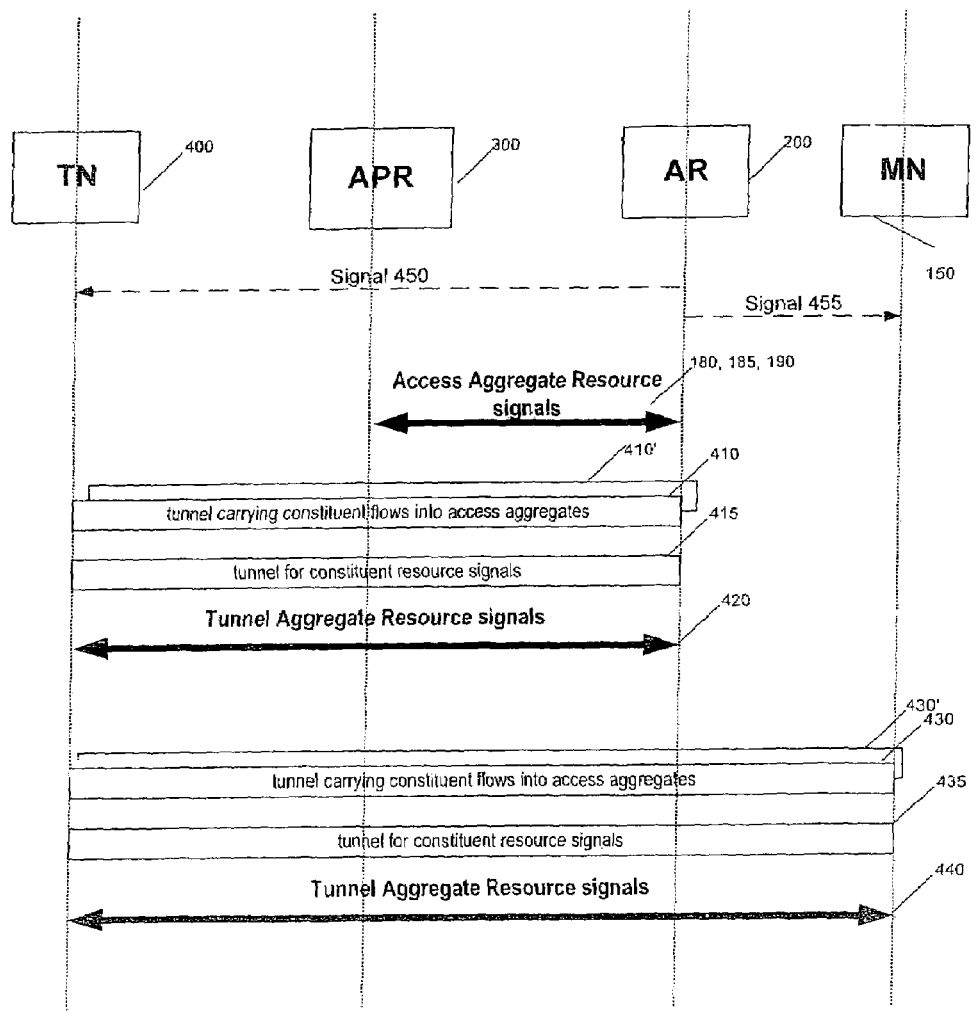
FIG. 6 illustrates integration of the access aggregation invention with a tunneling node (TN) 400 in accordance with the present invention.

FIG. 6 shows a tunneling node (TN) 400, the APR 300, the AR 200 and a MN 150. Aggregate resource signals 180, 185 and 190 operate between the APR 300 and the AR 200 as previously described, in response to resource request signals 156, 157, 157', 158, 158' and 159 received at the AR200. FIG. 6 shows that the TN 400 has a plurality of tunnels between itself and the AR200 as tunnels 410, 410' and/or the MN150 as tunnels 430, 430'. To provide differential resources to constituent flows, there is a mapping in the TN 400 between constituent flows and each of the plurality of tunnels, as well as optional tunnel aggregate resource signals 420,440 to manage resources for each of said tunnels 410, 410', 430, 430'. The TN 400 therefore includes similar state and routines for managing its aggregates and resources, as is included in the APR300, with the addition that the aggregation peer can be either the AR200 or the MN150. Tunnels 415 and 435 are used to carry constituent resource signals instead of tunnels 410, 410', 430, 430' so that the AR200 and APR300 can inspect such packets to affect admission control and resource management on the access link. The various tunnels 410, 410', 415, 430, 430', 435 are distinguished in the APR node 300 and AR 200 by their different tunnel header formats. The constituent classifiers, constituent resources, and the mapping to the aggregate classifiers and associated aggregate resources are signaled to the TN 400 by the AR 200 using signal 450, which includes equivalent information to aggregate resource signal message 180. Signal 455, which again reuses the information of message 180, is similarly used to signal the same information to the MN150 that is the tunnel endpoint for tunnels 430, 430'. Essentially, the AR200 treats the tunneled packets and the resources for those tunnels, as constituent flows and resources for the access link aggregates 160,161,162,170,171,172.

Figure 7:
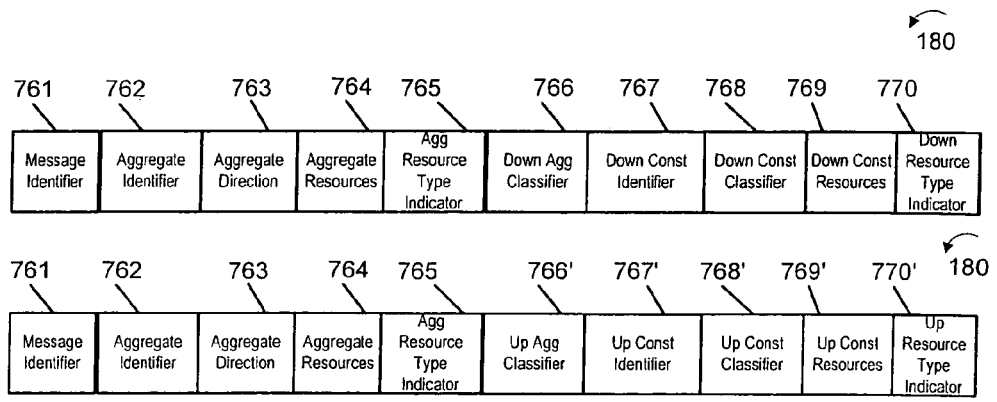
FIG. 7 illustrates exemplary aggregate resource signaling messages, in accordance with the invention.

FIG. 7 shows the contents of message 180 from FIG. 3. In FIG. 7 two different exemplary messages 180 are shown, e.g., one for an upstream packet flow aggregate and one for a downstream packet flow aggregate. Exemplary message 180, for an exemplary downstream aggregate, includes a message identifier part 761, an aggregate identifier part 762, an aggregate direction part 763, an aggregate resources part 764, an aggregate resources type indicator part 765, a downstream aggregate classifier part 766, a downstream constituent identifier part 767, a downstream constituent classifier part 786, a downstream constituent resources part 769, and a downstream resources type indicator 770. Exemplary message 180, for an exemplary upstream aggregate, includes a message identifier part 761, an aggregate identifier part 762, an aggregate direction part 763, an aggregate resources part 764, an aggregate resources type indicator part 765, an upstream aggregate classifier part 766', a upstream constituent identifier part 767', an upstream constituent classifier part 786', an upstream constituent resources part 769', and an upstream resources type indicator 770'. Message 180 is used by the AR200 to efficiently maintain the APR300 with information on the classifiers and resources 364, 367, 368 associated with constituent flows 163,173 and aggregates 160,161,162,170,171,172. Message part 761 contains a message identifier used to order messages and to match message 180 to the ack message 190. Message part 762 has an aggregate identifier assigned from an aggregate numbering space managed by the AR200. Message part 763 indicates whether the aggregate identifier 762 is for an upstream 160 or downstream aggregate 170. Message part 764 describes the resources associated with the identified aggregate 762 whilst message part 765 contains a resource type indicator used to describe how the aggregate resources 764 should be interpreted. This enables the resources part 764 to contain information about absolute, relative, absolute changes, relative changes in resources for the identified aggregate 762. For example, the aggregate resources type indicator part 765 can include a second aggregate identifier with an identified amount of resource from that second aggregate indicated in part 764. In this case, the resource type indicator 765 will indicate a resource swap from the second aggregate, of size indicated in part 764, into the identified aggregate indicated in part 762. Message part 766 describes the downlink aggregate classifier for the identified aggregate 762, which is included in message 180 when the aggregate identifier is first used to establish a binding between that aggregate identifier 762 and that classifier 766. The classifier is only needed however if the aggregate direction 763 indicates a downlink. Message part 767 includes a constituent identifier from a number space managed by the AR 200, an associated constituent classifier 768 which is needed in the message when the constituent identifier is first used to establish the binding between the identifier 767 and the classifier 768. Message part 769 describes the constituent resources associated with the identified constituent flow 767 and message part 770 indicates how the resource information 769 should be interpreted, enabling the resource information 769 to represent absolute, relative, an absolute or relative change in resources, as an exchange of resources between two constituent flows. Note that upstream message parts (766'–770') equivalent to the downstream message parts described, are also supported although in general upstream classification and resources are managed by the AR 200 and therefore do not need to be communicated to the APR 300. Message 180 can include multiple aggregate identifiers and associated classifier and resource state and can also include multiple constituent flow identifiers, classifiers and resources for any of said aggregate identifiers to provide efficient aggregate management signaling.

Figure 8:
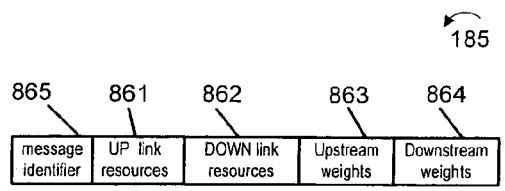
FIG. 8 illustrates an exemplary resource capacity signaling message, in accordance with the invention.

Message 185 is used to carry periodic information on the effective available downlink and uplink access link resources from the AR 200 to the APR 300, and is shown in FIG. 8. In one exemplary embodiment of the present invention, message 185 includes a message identifier part 865, an uplink resources part 861, a downlink resources part 862, an upstream weights part 863, and a downstream weights part 864. This various information in message 185 is used by the weighted preprogrammed response 366 in the APR 300 to adjust downstream resources per aggregate in sympathy with radio effects and admission control events at the AR 200. Message 185 is also used to inform the APR 300 of the weight values calculated at the AR 200 to be used to parameterize the method used for the weighted preprogrammed response 366, those weights representing the changes in admission control events at the AR 200. Finally, the total available downlink resource can be used over some measurement period to guide the setting of a mean available resource per aggregate to guide downstream admissions by the APR300. Note that message 185 may be included with message 180 in a single combined message to the APR 300. Message 185 includes a message identifier part 865 so that messages can be matched to responses and acknowledgements. Message part 861 identifies the Uplink resources on the access link and can be coded using absolute values or absolute change values, with a flag indicating which of the two types of information is being communicated. Message part 862 similarly describes the down link resources 862. Message part 863 describes a matrix of weights that parameterize the weighted programmed response for each aggregate in sympathy with the changes in the uplink access resources, whilst message part 864 deals with the weights for the downlink. Note that typically only the downstream weights are required because the AR200 deals locally with the uplink admission control. Total uplink resources might however be important to be included for the APR 300 so it can judge demand across multiple competing ARs 200, 200', 200" for internal APR 300 resources and interface resources into the core network.

Figure 9:
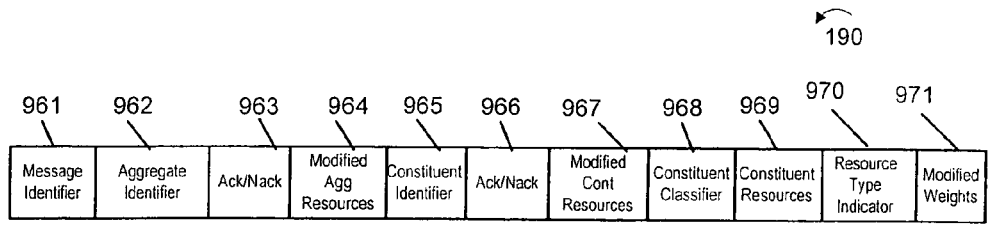
FIG. 9 illustrates an exemplary aggregate resource acknowledgement signaling message, in accordance with the invention.

Message 190 is the acknowledgement message for messages 180 and 185, and is shown in FIG. 9. In one exemplary embodiment of the invention, message 190 includes a message identifier part 961, an aggregate identifier part 962, an ack/nack part 963, a modified aggregate resource part 964, a constituent identifier part 965, an ack/nack part 966, a modified constituent resources part 967, a constituent classifier part 968, a constituent resources part 969, a resource type indicator 970, and a modified weights part 971. Message part 961 is the message identifier for message sequencing; message part 962 is the aggregate identifier, and message part 963 is the ack/nack for the requested changes to that aggregate. Message part 964 contains modified aggregate resource information, due to the action of the APR 300 based on local knowledge of resource constraints. Message part 965 then contains a constituent identifier; message part 966 contains an ack/nack for the message 180 request, and message part 967 contains information on modifications made to the requested resources for that constituent flow identified by message part 965. Therefore the combination of the message 180 and the message 190 enables the AR 200 to install constituent and aggregate state into the APR 300 whilst enabling the APR 300 to signal modifications made to the requested state. Message parts 968, 969 and 970 include information used to show the APR 300 reporting the admission of a constituent classifier 968, constituent resources 969 of a specific resource type 970, which is typically undertaken for the downstream direction within previously configured aggregate resources. Such entries are tied to the preceding aggregate identifier 962, instead of or in addition to the acknowledgement and modification information in message parts 963,964,965,966,967. The next message 180 is then used to confirm the constituent classifier and resources, and to assign a constituent flow identifier for that classifier. Finally, message part 971 includes modified weights which are adjustments made to the weights received from the AR 200 when the sum of weights across each of the ARs 200, 200', 200" does or could contravene a resource constraint 318 known to the APR 300.

The signaling between and processing within, the access node 200 and the aggregation peer node 300 will now be described with reference to FIGS. 3, 4, 5, 6, 7, 8, 9 and 10.

When an admission control event occurs in the AR 200, that event is passed to the access aggregation routine 215 via event 216, along with a constituent classifier and a constituent resource request for the constituent flows in each direction associated with that admission control event. This causes the access aggregation routine 215 to identify a target aggregate for each constituent flow and to check whether that aggregate has sufficient resources for that new constituent flow. Admission control events can be, for example, the arrival of a resource message for the constituent flow such as an RSVP Path or Resv message 158, or a Session Initiation Protocol (SIP)session Invite 157, containing Session Description Protocol state, or even a packet flow with a specific predefined resource requirement 163,173 (i.e., best effort data at 20 kbits/s maximum).

The admission control routine 217 compares the traffic and resource requirements of the constituent flow to the existing traffic and resource demands on the various aggregates, as well as default aggregation policy state 265, to identify the best (if any) aggregate for the constituent flow, and the associated required adjustment to the aggregate resources assigned to that aggregate.

For the admission of a downstream constituent packet flow 173 in the invention, the AR 200 sends message 180 to the APR 300 to inform it of the constituent flow classifier and the newly associated downstream aggregate such as downstream aggregate X 170. The message includes any required additional resources assigned to downstream aggregate X 170 to accommodate the new constituent flow. The APR 300 responds to this message with an acknowledgment message 190, along with any adjustment down in the assigned resources based on the limits of the capacity of the incoming interface from the core network, outgoing interface to the AR 200, and the processor 303 of the APR 300. Note that message 180 assigns resources for packets flowing in the opposite direction to the direction of message 180. Note also that the resources do not need to be adjusted if sufficient spare resource already exists in that aggregate.

For the admission of an upstream flow in accordance with the invention, the APR 300 does not need to know the mapping information and hence the aggregate or constituent classifier part of message 180 is not required. The AR 200 simply determines the mapping between the constituent flow and the upstream aggregate A 160, and then determines the required adjustment to resources in upstream aggregate A 160. As there are no intermediate routers 506 between the AR 200 and the APR 300 then the upstream resources for aggregate A 160 also does not necessarily need to be sent in message 180. The Acknowledgement message 190 is used for upstream aggregates when message 180 is sent, and can contain an adjustment down in the assigned upstream resources based on the limits of the capacity of the incoming interface from AR 200 and the processor of the APR 300. Note that message 180 this time assigns resources for packets flowing in the same direction as message 180.

In accordance with another feature of the invention, if the upstream interface of the APR 300, towards the core network, is potentially a congested link, and that link 118 has further been divided into allocations for the traffic in upstream aggregates A 160, B 161, C 162 from ARs 200, 200', 200", then the APR 300 may limit the sum of the resources for aggregates A 160 from the AR 200, 200', 200" to be less than the size of the allocation for aggregate A 160 on the upstream link 118 at the APR 300. Therefore, the resource signal 180 still should be sent from the AR 200 to the APR 300 so that the APR 300 can compare the sum of resource allocations for aggregates A 160 from ARs 200, 200', 200", and proportionally reduce them within the bounds of the aggregate A 160 into the core. The APR 300, but not other devices, knows about the total demand from other ARs 200, 200', 200" and hence the APR 300 should be able to simply and fairly balance uplink capacity across ARs 200, 200', 200" weighted by the demand from each AR 200 200', 200", and also weighted by the need to minimize signaling at the APR 300 with the ARs 200, 200', 200". If this later consideration is not taken into account then a single message from a single AR, for example, AR 200' to the APR 300 could otherwise trigger a message 190 to the ARs 200, 200', 200" connected to that APR 300, requesting minimal resource reduction from each of them to accommodate the request from AR 200'. In a preferred embodiment, a request for resources from AR 200' results in either the request being promptly accepted, or being refused, or being accepted by removing equivalent resources from another single AR, for example AR 200". A weighted proportional response across the ARs 200, 200', 200" is then installed over time as the APR 300 periodically signals resource adjustments to its directly connected ARs 200, 200', 200" that rebalance resources between ARs 200, 200', 200". Similarly, when the downstream interface from the core network is split into an allocation for downstream aggregate X 170 into APR 300, then the APR 300 can undertake the adjudication of downlink resource requests from ARs 200,200', 200" for aggregate X 170 over the access links using the acknowledgement message followed by the weighted pre-programmed responses to the ARs 200, 200', 200".

In accordance with another feature of the invention, message 180 includes information on additional constituent flows (in the form of classifiers/resources) that have been added to/still in/removed from, an aggregate. This is the preferred method when the constituent flow does not itself have constituent resource messages that could instead carry the assigned aggregate identifier, but the function is independent of whether or not a constituent resource message exists that in fact could otherwise carry the information of message 180. In addition, the aggregate resource message should periodically aim to refresh the complete list of constituent flows in each aggregate to ensure that both aggregation peers keep in step with each other by refreshing this mapping state. Alternatively, the target aggregate for a constituent flow resource message 158 can be added to that specific constituent resource message in the form of the aggregate identifier 762. The refreshing of the constituent flow resource state is then sufficient to refresh the aggregate mapping state. The aggregate identifiers are assigned by the AR 200, distributed to both ends of the aggregation region, and associated with a specific aggregate classifier, such that the full aggregate classifier does not need to be repeated in constituent and aggregate resource messages. Such classifiers can include information on source/destination addresses, source/destination ports, protocols_ids, diff-serv codepoints for example.

In a preferred embodiment, the Downstream aggregation classifiers, e.g. 367X, in the APR 300 are pre-configured by a management process into default aggregation state 365, or signaled by the AR 200 in message 180 carried in an aggregate resource message, so that the APR 300 can immediately but temporarily admit a constituent flow into a downstream aggregate without waiting for a further message 180 from the AR 200, if spare resources exist in the target aggregate. In a further preferred embodiment, the APR 300 can, and does, admit the flow into a downstream aggregate even if spare resources do not exist in that aggregate, but spare resources do exist in another downstream aggregate that may safely be borrowed. It can do this by issuing a resource message 190 for the two aggregates to immediately move aggregate resources between them, by using the message fields 968,969,970. The AR 200 replies with a message 180 with potentially updated aggregate resource values. In a further preferred embodiment, the APR 300 knows which types of constituent flows and aggregates for which it can undertake such premature aggregate resource adjustments, rather than waiting for the AR 200 to make that decision, such information stored in default state 365.

In accordance with yet another feature of the invention, the aggregate resource signals can be sent as a condensed list of aggregate numbers and associated absolute or fractional resources assigned to each aggregate from the total resources on the access link 115, by binding the identifier to a classifier in the initial message.

In a further inventive step, the aggregate resource signals can be sent as a condensed list of aggregate numbers and fractional or absolute resource offsets (positive and negative).

In a further inventive step, the aggregate resource signals can be sent as an offset applied to two aggregates so indicating a positive change to the resources in one aggregate and a matching negative change to the second aggregate.

In accordance with yet another feature of the invention, each AR 200 has knowledge of the present upstream air-link capacity at that AR 200, stored in up/down radio resources information 269. The AR 200 has a weighted preprogrammed response per aggregate 266 to the uplink cell capacity information which affects the constituent flows likely to be scheduled by the AR 200 over the wireless links 142,147, given those uplink resources and presently admitted MNs 150,151 and sessions. This enables the AR 200 to determine the likely impact on the required resources for uplink aggregate resources, and hence enables it to adjust upstream resources per aggregate on the access link 115 in line with the total available uplink resources. The AR 200 can, and does, report this total capacity information to the APR 300 in a resource message 185. The APR 300 then has the same weighted preprogrammed response per aggregate 366 as the weighted pre-programmed response per aggregate 266 in the AR 200, and is therefore used with the total uplink capacity information to correctly determine likely required resources per aggregate per AR 200 on its incoming interface from the ARs 200, 200', 200". The APR 300 can then use this information to assist it with its fairness calculations between, say aggregates A 160, from some or all ARs 200, 200', 200" for proportional access onto the congested upstream interface, within the resource constraints 318. Specifically, it can be used to avoid the APR 300 assigning short term resources to ARs 200, 200', 200" that cannot utilize those resources, e.g., given present wireless link capacity in cell 148.

The AR 200 sending the total uplink capacity to the APR 300, and the APR 300 having a weighted preprogrammed response per aggregate 366 to that capacity number, avoids the AR 200 having to send a resource message for each individual aggregate A 160, B 161, C 162 each time capacity changes on the airlink, which therefore reduces signaling bandwidth demands and reduces the latency of such resource changes. In a preferred embodiment, the AR 200 periodically adjusts and sends the weights for the preprogrammed weighted response per aggregate 366 to the APR 300 in message 185. In such an embodiment, the AR 200 has bounds on the rate and size of resource adjustments for the weighted preprogrammed responses per aggregate 266, 366 defined to ensure stability and to limit signaling bandwidth over the access link 115.

Similarly, the AR 200 can also record the available downstream resources over the air-link in up/down radio resources 269 and send this information, converted into access link resources, and in a preferred embodiment including the dynamic weights, to the APR 300 in a resource message 185 to be stored locally in downstream resources 369. The APR 300 can then apply the equivalent downstream weighted preprogrammed response per aggregate 366 for the downlink and therefore adjust the downstream resources per aggregate without requiring the AR 200 to signal the resources changes for each aggregate. This ensures that the APR 300 does not allow packets to traverse the link at a rate significantly higher than the scheduler can service over the air-link, given air-link resource changes, and hence avoiding buffers in the AR 200 to become full which can lead to packet loss and application interference. Note that the speed of the response to capacity changes should be faster than that of TCP for data flows, because otherwise TCP would itself deal with the buffer congestion with its own congestion avoidance techniques. For non-TCP flows, the resource fluctuations need to be sufficiently fast to maintain the desired packet distribution in the AR 200 buffers for the scheduler to maximize the utility of the air-link through quality of service targets.

In accordance with the invention, the weights can be sent without signaling any change in overall resources, when the allocation of the access link 115 resource changes are to be redirected to better balance the resources per aggregate given present demand. This could be in response to a high Voice over Internet Protocol (VoIP) demand, or a large number of multicast users, or an ongoing inability for the scheduler on the air-link to maximize the utility of the air-link given a shortfall in the arrival rate of certain types of traffic in a specific aggregate. As an example, a weighted preprogrammed response for VoIP traffic would be to keep the VoIP aggregate size unchanged (to maintain voice quality), whilst the weighted pre-programmed response for three levels of data service would be to reduce the aggregate capacity differentially across those three data service levels so less of the resource change is experienced by premier data service users, and more would be experienced by low data service level users. Note that for correct operation, the weighted preprogrammed response should be consistently applied to the air-link and to both ends of the access link 115 (ARs 200 and APRs 300).

The resource parameters (absolute or fractional, plus weights) in the upstream and downstream aggregates are adjusted based on the type and status of MNs 150, 151 present in the cell 148. Each MN 150, 151 has a MN profile 218*a*, 218*b* which indicates the type of services, and associated quality of service targets, for those MNs 150, 151, idicating into which access aggregates the constituent flows to/from each MN 150, 151 should be mapped. Therefore, as MNs 150, 151 are admitted, hand-off or move from and to active/sleep states, the AR 200 can re-optimize resources per aggregate in each direction to maintain the differential and absolute services levels appropriate for that MN population 150, 151. In addition, as MNs 150, 151 have to send mobility signals to remain reachable and to hand-off between ARs 200, 200', 200", then the amount of mobility signaling resources required on the access link 115 can be adjusted based on the population of MNs 150, 151 in the cell 148 and present local hand-off dynamics.

The ongoing load for communication sessions per MN 150 in combination with the MN Quality of Service (QoS) profile for those sessions, can be used to further optimize aggregate resource parameters, which can then additionally be precisely adjusted for those sessions that include explicit resource and session signaling requests from MNs 150,151 such as those for VoIP calls.

The aggregate resource parameters can be adjusted based on known (configured or discovered) traffic patterns at that AR 200 such as busy hour call attempts, weekend gaming peaks etc, such that resources are not committed to competing aggregates when they will likely be needed for arriving MNs 150,151 and session traffic. Such traffic pattern information is stored in the default aggregation state 265.

Returning to the tunneling node (TN) 400 in FIG. 6, it can be appreciated that if downstream constituent resource signaling packets addressed to the MN 150, such as RSVP Path messages, are encapsulated into tunnel 410 at TN 400 towards the AR 200, then those resource signals will not be seen by the APR 300 due to the tunneling and encapsulation. Therefore the APR 300 will not be able to undertake the premature mapping into a downstream aggregate and the associated resource adjustment using messages 180, 185, 190. However, admission control can still be undertaken by the AR 200 as previously described because the AR 200 will still see the constituent resource message 158, 158' in both directions. For the uplink direction, again the APR 300 will not see upstream constituent RSVP Path and Resv messages nor can respond to uplink constituent flow messages, but this is fine because the APR is fully dependent on AR 200 for upstream traffic aggregation, and AR 200 still sees these constituent resource messages.

If however, the TN 400 has a bidirectional tunnel 430 not with the AR 200 but with the MN 150, as would occur when the MN 150 is using a Collocated Care of Address (CCoA) and also shown in FIG. 6, then even the AR 200 may not see either upstream or downstream constituent resource messages 158,158' because they are hidden by the tunnel encapsulation. The AR 200 will therefore not be able to undertake the admission control function into the aggregate resources for the APR 300 and again the APR 300 will not be able to undertake premature admission into an aggregate for downstream traffic. Therefore, in accordance with another feature of the invention, the TN 400 and the tunnel peer (either AR 200 or MN 150) tunnel constituent resource messages 158,158' to each other using an agreed tunnel header format, 415 and 435 respectively, that indicates to the AR 200 and the APR 300 that such a tunnel contains resource signaling packets that need to be examined for resource aggregation purposes. The tunnel header format 415 and 435 are therefore different from the tunnel header formats used for tunnels 410 and 430. Alternatively, the TN 400 or MN 150 can send a copy of the constituent resource message to the AR 200 and/or the APR 300 for admission control processing, which can then be discarded.

In a further inventive step, the TN 400 and MN 150, or the TN 400 and the AR 200 can undertake the aggregation of the tunneled constituent resource messages, into tunnel aggregate resource messages 440 and 420 respectively, and then signal this tunnel aggregate information via the APR 300 and the AR 200. Such tunnel aggregate messages will no longer be tunneled and will instead pass directly between the tunnel endpoints and the intermediate routers. The tunnel resource aggregates would in this case simply separate the constituent resources into different classes of traffic such as for VoIP or video streaming. The AR 200 can then use these aggregate resource messages, as constituent resource message 158,158' for the resource control process with the APR 300 for the access aggregates. The AR 200 therefore aggregates these tunnel aggregate resources and flows into the access link aggregates A 160, B 161, C 162, X 170, Y 171 and Z 172 that exist over the access link 115 for different types of traffic. When the tunnel 430 is between the TN 400 and the MN 150, the preferred embodiment is that the constituent to tunnel resource aggregation occurs at the TN 400 and the MN 150 into messages 440, and then the subsequent tunnel resource to access link (DSCP based) resource aggregation occurs at the AR 200 and the APR 300, with the AR 200 controlling both directions of aggregation, using messages 180, 190. Similarly, if the tunnel 410 is between the TN 400 and the AR 200 then the constituent to tunnel aggregation into messages 420, and the tunnel to the access link 115 aggregation again occurs between the APR 300 and the AR 200 using messages 180 and 190. If excess resources are admitted into a tunnel resource aggregate 420, 440 then the AR 200 (and APR 300 in the downstream case) can modify messages 420, 440 associated with that aggregate to increase resources or to cause the tunnel aggregator to refuse one or more of the constituent resource flows in that tunnel resource aggregate 420, 440. This approach enables the AR 200 to once again control aggregation, and the APR 300, in either tunneling configuration, to once again support premature admission into a downstream aggregate X 170, Y 171 or Z 172 along with early adjustment of resources for the selected aggregate.

In the above mentioned tunnel scenarios, once the resource admission control process has completed, and a mapping has been determined between the constituent resource flow and the tunnel resource aggregate 410, 430, and then between the tunnel resource aggregate and the access link 115 resource aggregate between the APR 300 and the AR 200 (downstream) and the AR 200 and the APR 300 (upstream), a further problem remains.

Neither the APR 300 in the downstream direction, nor the AR 200 in the upstream direction (in the tunnel 430 configuration) may be able to correctly aggregate the packets from the constituent flows into the aggregates. This is because the downstream constituent flow will arrive encapsulated at the APR 300 in the tunnel header 410,430 that was added by the TN 400, and may arrive at the AR 200 encapsulated in the tunnel 430 by the MN 150. If some or all of the encapsulated flows from the TN 400 and/or the MN 150 use the same tunnel header, then the various constituent flows cannot be distinguished in the APR 300 or the AR 200, by looking simply at the outer packet header.

In accordance with another feature of the invention, the admission control process in the AR 200 for the access link aggregate first determines whether the constituent flow identified by the constituent resource messages 158,158' will be encapsulated when they arrive at the APR 300 or the AR 200. In such cases, the AR 200 informs the APR 300 that the constituent classifier communicated to the APR 300, and known to the AR 200 is used by both nodes to match an access link aggregate against the inner header of tunneled constituent flow packets, rather than against the outer header, as described by the constituent classifier information in message 180. The outer header can then subsequently be adjusted to match the identified access link aggregate classifier, by, for example, remarking the DSCP. However, matching on inner headers can be an expensive and complex process.

In an alternative embodiment of the invention multiple parallel tunnels 410, 410', 430, 430' are used with distinct header encapsulations between the tunnel aggregation peers. The required outer header format for the tunnels 420, 440 (from the tunnel aggregate classifier) for the tunnel encapsulator (the TN 400, MN 150 or AR 200) can be, and in various embodiments are, pre-configured, computable or signaled to the TN 400 and MN 150 by the AR 200, with the matching constituent classifier. The TN 400 and MN 150 will apply the correct tunnel encapsulation for that constituent flow, and then the AR 200 or APR 300 will map that tunnel aggregate flow into the target access link aggregate A 160, B 161, C 162, X 170, Y 171 and Z 172 using the tunnel aggregate (as a constituent classifier) to access link aggregate classifiers. In various embodiments, the tunnel aggregates and the access link aggregates share a common classifier such that the APR 300 and AR 200 can forward the arriving tunneled packets into the correct access link aggregate matching the outer header, without needing to know about the constituent classifiers for the encapsulated packets, nor having to undertake extensive header processing. In such an embodiment, the access link aggregation classifiers signaled in advance by the AR 200 to the APR 300, in message 180, may now be a 1:1 match with those known in advance at the TN 400. The tunnel aggregation classifiers (constituent flow to tunnel aggregate) can be installed into the TN 400, MN 150 and AR 200, via a management process, or can be added into tunnel resource management messages 420, 440 that traverse the MN 150, AR 200 and the TN 400 (FIG. 6), or can even be added into tunnel management signaling messages 450, 455 such as Mobile IP Registration Requests (RREQs), Registration Replies (RREPs) and Binding Updates (BU) that also visit these nodes in the case of the tunneling node 400 being a MIP home agent, MIP foreign agent and/or correspondent node 155. The tunnel aggregation peers therefore undertake the constituent flow aggregation process for the access link aggregates, preferably under the control of the AR 200, whilst the AR 200 handles the resource management process for those access link aggregates A 160, B 161, C 162, X 170; Y 171 and Z 172 with the APR 300, as shown in FIG. 3. Further, neither the TN 400 nor MN 150 need to undertake resource aggregation management for the tunnel aggregates. This is safe if plentiful bandwidth exists between the TN 400 and the APR 300, and the resources constraints for the flows are therefore limited to the access link and air-link which are both now under the control of the AR 200. If the AR 200 detects to many constituent flows being mapped into an aggregate A 160, B 161, C 162, X 170, Y 171 and Z 172, then the AR 200 can either adjust the resources for that aggregate, or tell the TN 400 (downstream) or MN 150 (upstream) to change the mapping for that constituent flow, or in fact remove the admission of said flow from that aggregate. This additionally requires that the AR 200 should have access to constituent resource messages before they are aggregated by the tunnel aggregation peers so that the correct tunnel and hence access aggregate can be selected.

Figure 10:
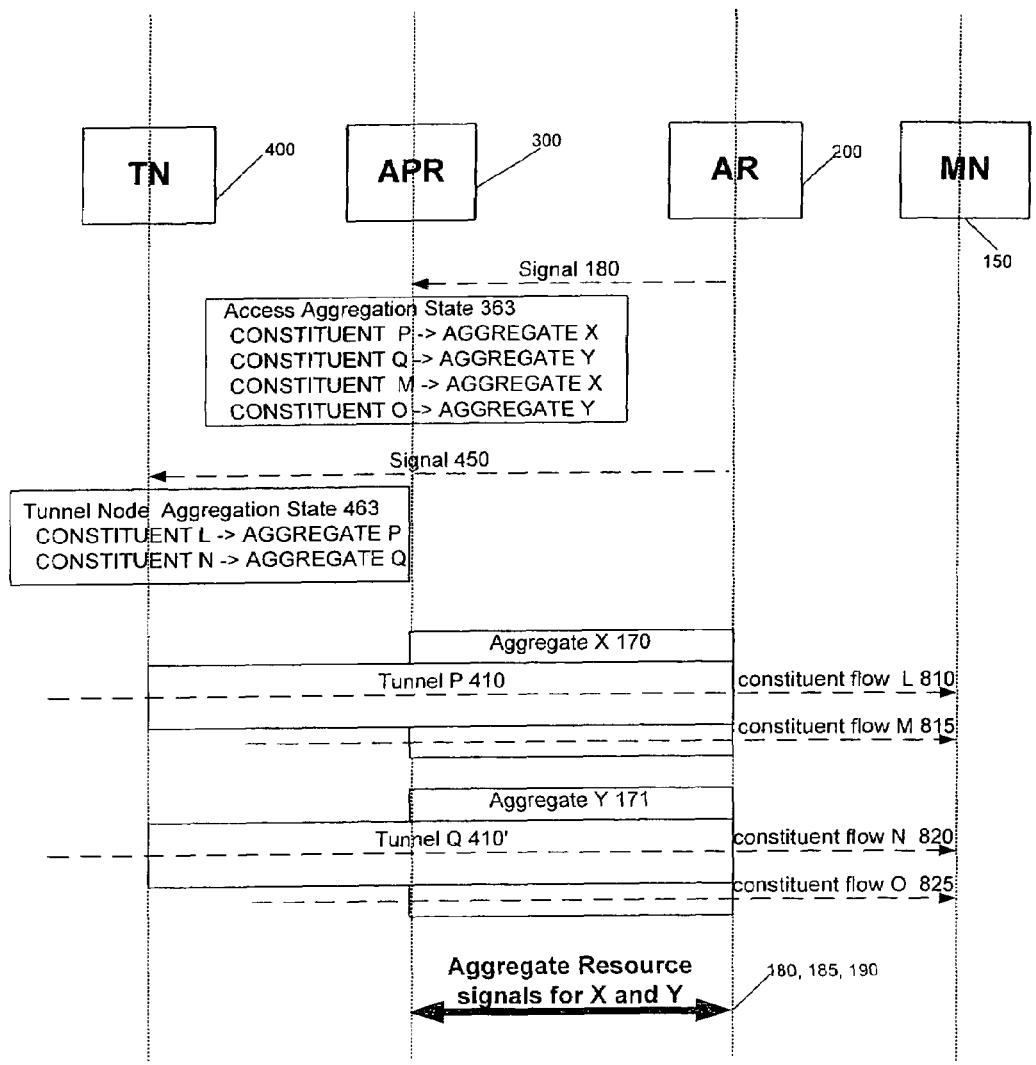
FIG. 10 illustrates an exemplary embodiment of the interworking between the access link aggregates and the tunnels from an exemplary tunneling node, in accordance with the present invention.

FIG. 10 illustrates an exemplary embodiment of the interworking between the access link aggregates and the tunnels from the TN 400. Signal 180 is sent from the AR 200 to the APR 300 to install mappings between constituents flows P, Q, M and O and access aggregates X 170 and Y 171, into Access Aggregation Peer Node State 363. Access Aggregation state 263 will also store this mapping between constituents and access aggregates. Signal 450 is then sent by the AR 200 to the TN 400 to install mappings between Constituent flows L and N into tunnel aggregates P and Q, into Tunnel node Aggregation State 463. Constituent flow L 810 will then be mapped into Tunnel P 410 at TN 400 and then mapped into access aggregate X 170 at the APR 300. Similarly, constituent flow N 820 will be mapped into Tunnel Q 410', which itself will be mapped into Aggregate Y 171 in the APR 300. Clearly, if the classifier for the aggregates X and Y are the same as the classifiers for the tunnels P and Q, then the TN 400 will effectively be admitting the constituent flows L 810 and N 820 and hence will save the APR 300 from having to undertaken any additional packet header processing (as would otherwise be necessary to make packets match the aggregate classifier). Meanwhile, constituent flows M 815 and O 825, which do not visit the TN 400, will be admitted into the aggregates X 170 and Y 171 at the APR 300 and will hence require header manipulation, such as encapsulation, to match the aggregate classifiers. In either case, constituents will be mapped into the aggregates over the access link and then signals 180, 185 and 190 can be used to adjust the total amount of resource for each of the aggregates, as well as the specific resources per aggregate, so that admission control targets can be maintained. This reduces the need for tunnel aggregate resource signals to be sent to the TN 400 from the AR 200. Hence, the AR 200 is able to efficiently coordinate with the APR 300 and TN 400, the constituent to aggregate mappings and associated resource signals within a hierarchical aggregation scheme (tunnel plus access aggregates). A similar scheme operates for the uplink tunnels and access aggregates from the MN 150 and the AR 200.

In one simplified example of the present invention, for using the TN 400 aggregate classifier that matches the required access aggregate classifier, the TN 400 and MN 150 can simply transfer the DSCP value from the inner header of its constituent flow into the outer header of the tunnel aggregate encapsulation, and the AR 200 and APR 300 can then use the same DSCP values for each access aggregate classifier over the access link 115. This ensures that the encapsulation process in the TN 400 and MN 150 automatically selects the target downstream aggregate X 170, Y 171 at the APR 300 and the AR 200. The AR 200 then simply varies the resources per DSCP aggregate in line with AR 200 events in the cell 148. Similarly for the MN 150, the AR 200 and the upstream aggregates A 160, B 161 and C 162, whereby the AR manages the resources for the aggregates whilst the MN 150 installs the correct DSCP code for the access aggregate whether or not the MN 150 adds the tunnel header towards the TN 400.

Figure 11:
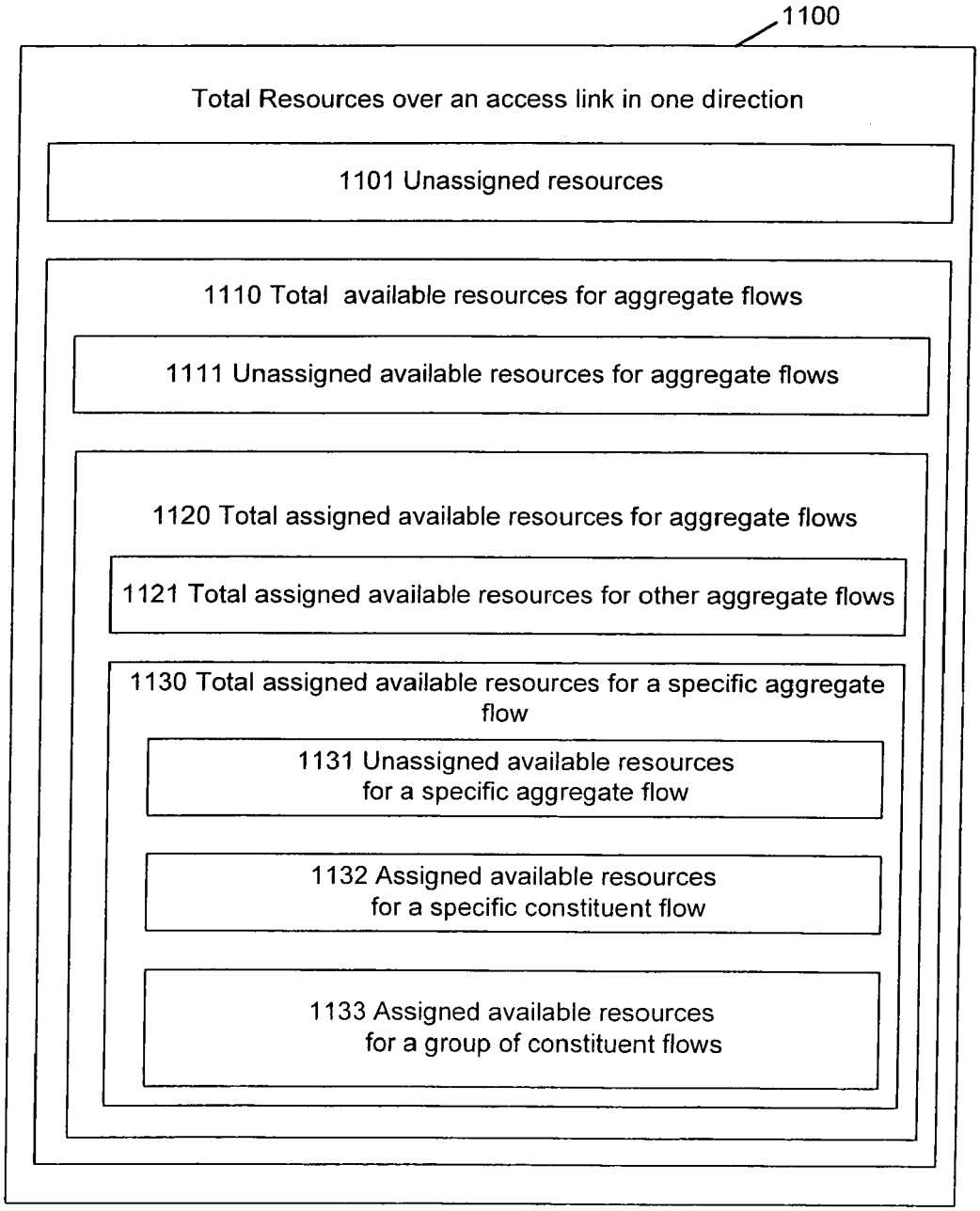
FIG. 11 illustrates an exemplary subdivision of total access link resources that exist in one direction over an access link, in accordance with the invention.
Figure 12A:
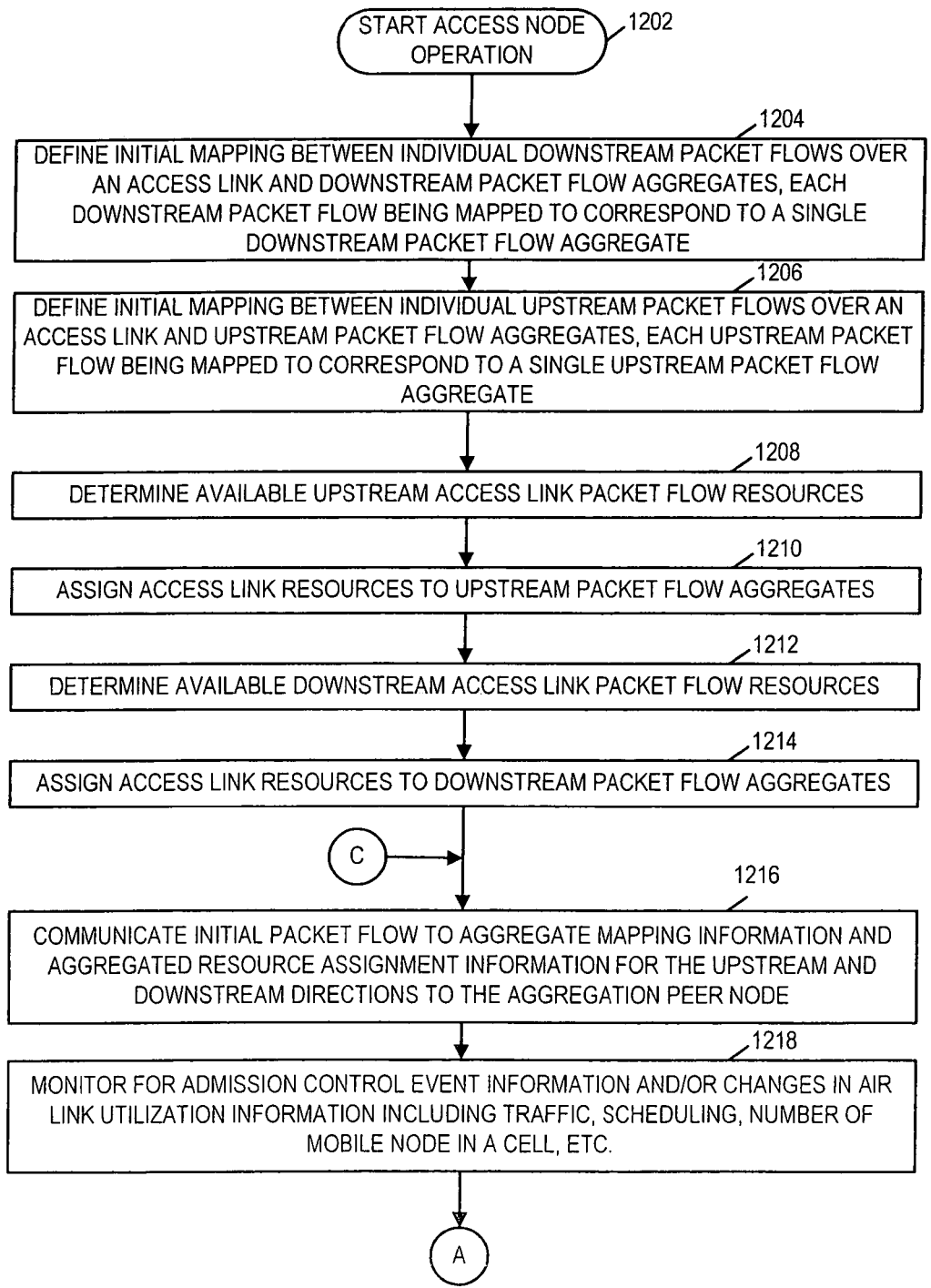
FIG. 12 which comprises the combination of FIGS. 12A through 12D, is a flowchart showing steps involved in operating an access node in one particular exemplary embodiment of the present invention.
Figure 12B:
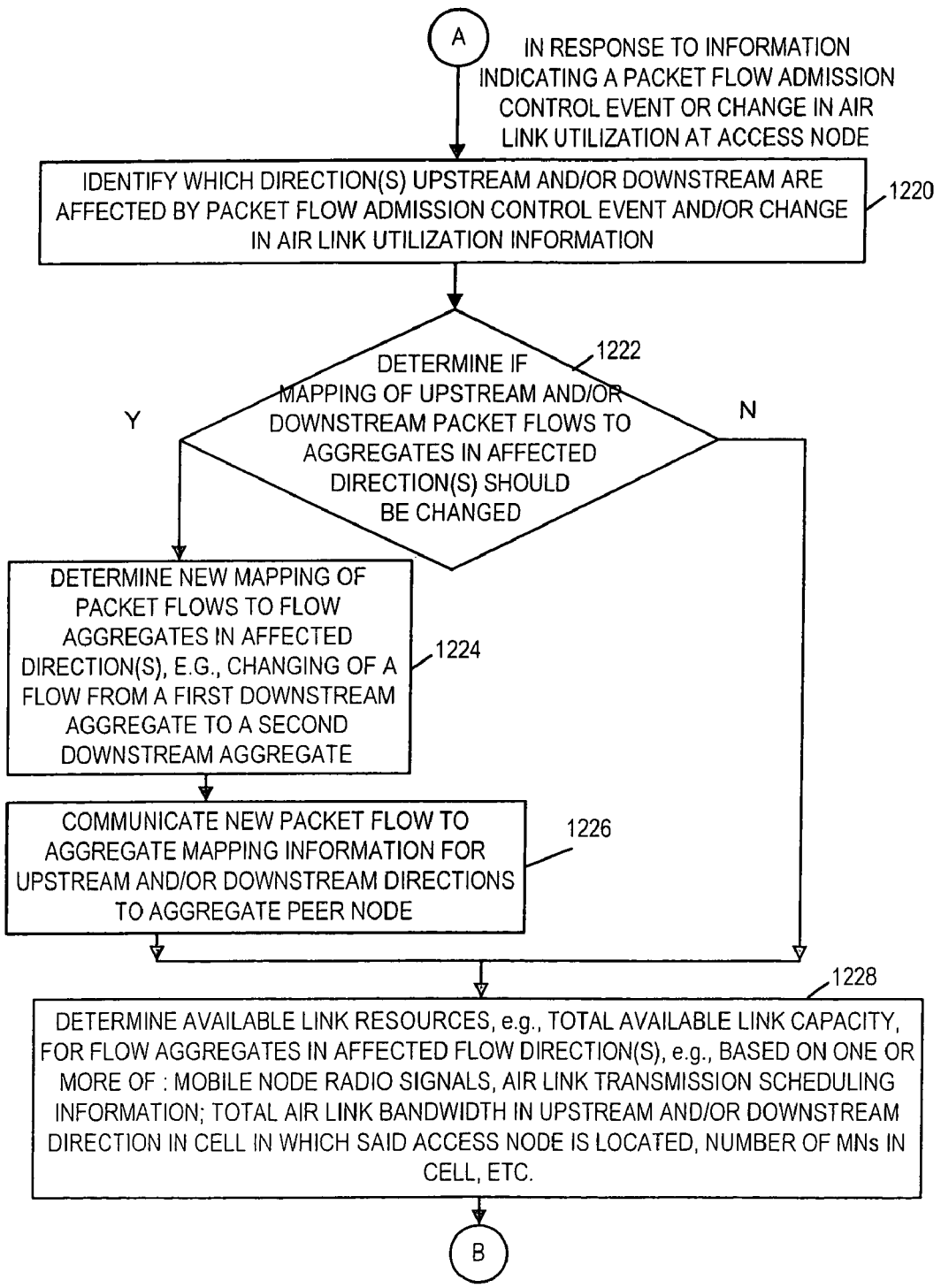
Figure 12C:
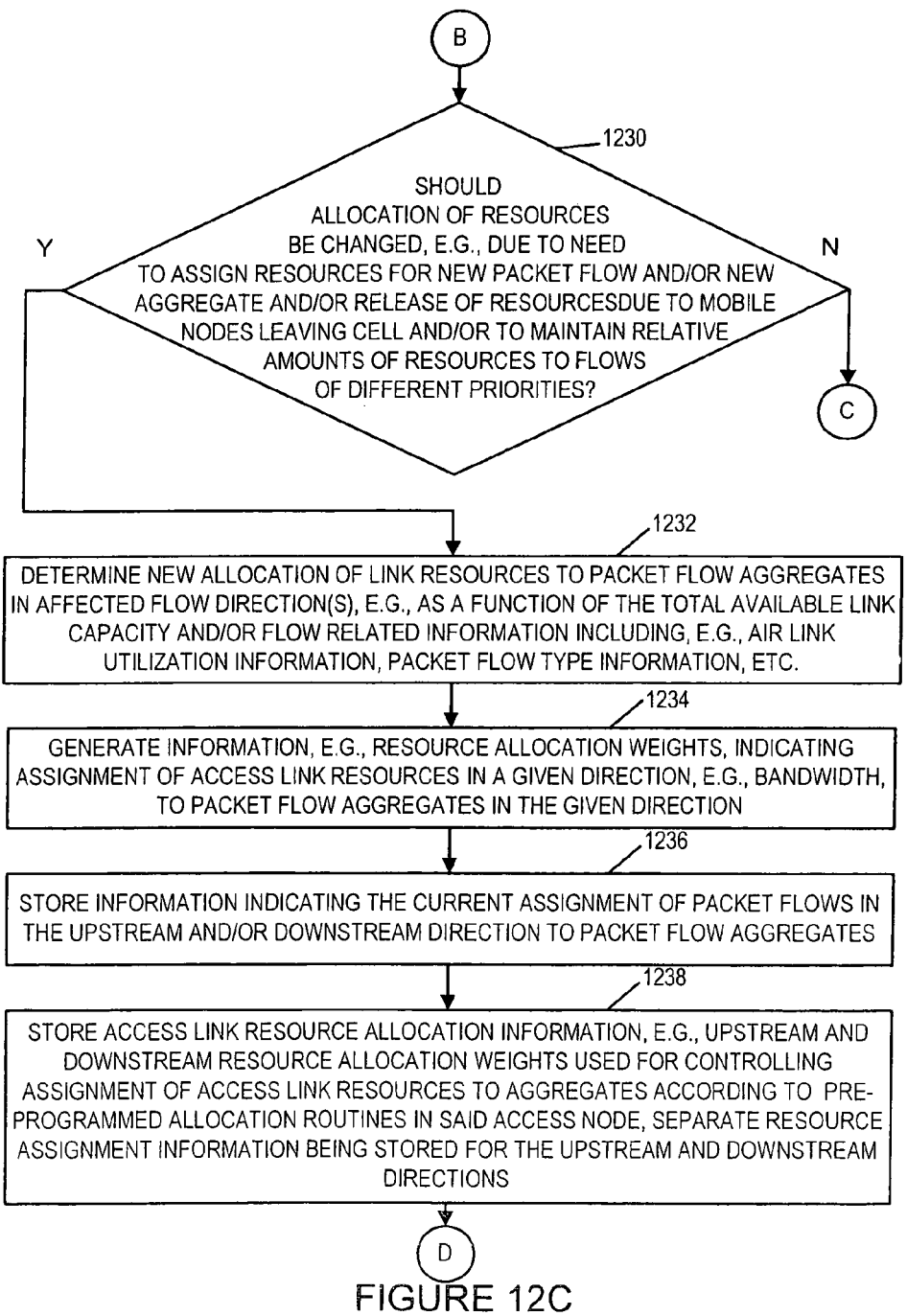
Figure 12D:
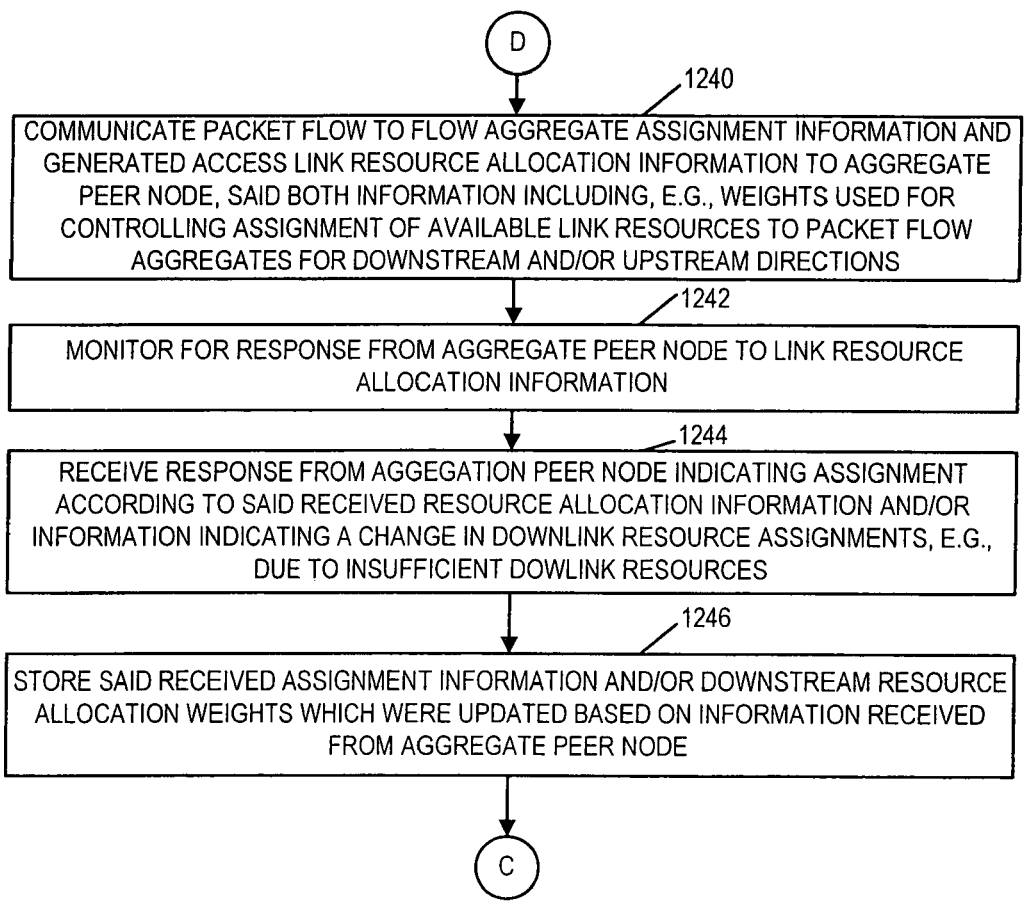

FIG. 11 illustrates an exemplary subdivision of total access link resources 1100 that exist in one direction over an access link 115, in accordance with the invention. Firstly, some portion of the total resources 1100 are left as unassigned resources 1101 at any point in time, acting as a spare pool to deal with other non-aggregate traffic or to cope with unexpected future events. This leaves total available resources for aggregate flows 1110 over access link 115. Some portion of available resources 1110 are also left as unassigned available resources 1111 which is used as a spare pool which can be redeployed rapidly into any aggregate flow as demand varies. This leaves total assigned available resources for aggregate flows 1120. Some of this will be assigned to a specific aggregate flow 1130 whilst the remainder 1121 can be viewed as being assigned to the other aggregate flows on the access link and therein subdivided in a similar manner as will be now described for the specific aggregate flow 1130. The total assigned available resources for a specific aggregate flow 1130 is broken down into an unassigned available resource for that specific flow 1131, an assigned available resources for a specific constituent flow 1132, and an assigned available resource sfor a group of constituent flows 1133. Unassigned available resources for a specific aggregate flow 1131 can enable the rapid admission of a new constituent flow into the aggregate without requiring the total assigned resources 1130 having to be adjusted via signaling. Assigned amount of available resource for a specific constituent flow 1132 is a part of the total resource 1130 that is reserved (exclusive) for that specific constituent flow. Assigned amount of resources for a group of constituent flows 1133 enables a number of constituent flows to share a pool of bandwidth out of the total aggregate resources for that aggregate 1130. Although only one assigned available resources for a specific constituent flow 1132 and only one assigned available resources for a group of constituent flows 1133 are shown, there may be multiple subdivisions of the total resources 1130 to support exclusive resources for multiple constituent flows, and to support multiple shared resources pools for other groups of constituent flows, within that aggregate. In addition, there may be multiple types of unassigned resource pools 1131 that reserve resource for specific types of constituent flows, and groups of constituent flows, that are yet to be admitted.

FIG. 12 shows steps involved in operating an access node 200 in one particular exemplary embodiment of the present invention. In step 1202 the access node 200 is powered on and initialized and access mode 200 operation starts. Operation proceeds to step 1204, where the access node 200 defines an initial mapping between individual downstream packet flows over an access link 115 and downstream packet flow aggregates, each downstream packet flow being mapped to correspond to a single downstream packet flow aggregate. In step 1206, the access node 200 defines an initial mapping between individual upstream packet flows over an access link 115 and upstream packet flow aggregates, each upstream packet flow being mapped to correspond to a single upstream packet flow aggregate. Then, in step 1208, the access node 200 determines available upstream access link packet flow resources. Next, in step 1210, the access node 200 assigns access link resources to upstream packet flow aggregates. Operation proceeds to step 1212, where the access node 200 determines available downstream access link packet flow resources. Then, in step 1214, the access node 200 assigns access link resources to downstream packet flow aggregates. In step 1216, the access node 200 communicates initial packet flow to aggregate mapping information and aggregate resource assignment information for the upstream and downstream directions to the aggregation peer node 300. Operation proceeds to step 1218, where the access node 200 monitors for admission control event information and/or changes in air link utilization information including traffic, scheduling, number of mobile nodes in a cell, etc. In response to information indicating a packet flow admission control event or a change in air link utilization at the access node 200, operation proceeds to step 1220 (via connecting node A). In step 1220, the access node 200 identifies which direction(s), upstream and/or downstream, are affected by packet flow admission control event(s) and or a change in air link utilization information. Next, in step 1222, the access node 200 determines if the mapping of upstream and/or downstream packet flows to aggregates in the affected direction(s) should be changed. If it is determined in step 1222 that the mapping should be changed, operation proceeds to step 1224. In step 1224, the access node 200 determines new mapping(s) of packet flows to aggregates in the affected direction(s), e.g., changing of a flow from a first downstream aggregate to a second downstream aggregate. Next, in step 1226, the access node 200 communicates the new packet flow aggregate mapping information for upstream and/or downstream directions to aggregate peer node 300, and then operation proceeds to step 1228. If it is determined in step 1222, that the mapping of upstream and/or downstream packet flows to aggregates in the affected direction(s) should not be changed, then operation proceeds to step 1228. In step 1228, the access node 200 determines available access link resources, e.g., total available link capacity, for flow aggregates in affected flow direction(s), e.g., based on one or more of: mobile node radio signals, air link transmission scheduling information; air link capacity; total air link bandwidth in upstream and/or downstream direction in cell in which said access node 200 is located, number of MNs in cell, etc. Operation proceeds from step 1228 to step 1230 (via connecting node B). In step 1230, the access node 200 decides whether the allocation of link resources should be changed, e.g., due to the need to assign resources for new packet flow and/or new aggregate and/or release of resources due to mobile node(s) leaving the cell and/or to maintain relative amounts of resources to flows of different priorities. In step 1230, if it was decided that allocation of resources should not be changed, then operation proceeds via connecting node C back to step 1218, where monitoring occurs. In step 1230, if it was decided that allocation of access link resources should be changed, operation proceeds to step 1232. In step 1232, the access node 200 determines new allocation of link resources to packet flow aggregates in the affected flow direction(s), e.g., as a function of the total available link capacity and/or flow related information including, e.g., air link utilization information, packet flow type information, etc. Next, in step 1234, access node 200 generates information, e.g., resource allocation weights, indicating assignment of access link resources in a given direction, e.g., bandwidth to packet flow aggregates in the given direction. Then, in step 1236, the access node 200 stores information indicating the current assignment of packet flows in the upstream and/or downstream direction to packet flow aggregates. Next, operation proceeds to step 1238, where the access node 200 stores access link resource allocation information, e.g., upstream and downstream resource allocation weights used for controlling assignment of access link resources to aggregates according to preprogrammed allocation routines in said access node 200, separate resource assignment information being stored for the upstream and downstream directions. Operation proceeds from step 1238 to step 1240 (via connecting node D). In step 1240, the access node 200 communicates packet flow to flow aggregate assignment information and generated access link resource allocation information to aggregate peer node 300, said both information including, e.g., weights used for controlling assignment of available link resources to packet flow aggregates for downstream and/or upstream directions. Then in step 1242, the access node 200 monitors for response from aggregation peer node to link resource allocation information. In step 1244, the access node 200 receives response from aggregation peer node indicating assignment according to said received resource allocation information and/or information indicating a change in downlink resource assignments, e.g., due to insufficient downlink resources. In step 1246, the access node 200 stores said received assignment information and/or downstream resource allocation weights which were updated based on information received from aggregate peer node. From step 1246, operation returns via connecting node C to step 1218 in which monitoring is performed.

Figure 13A:
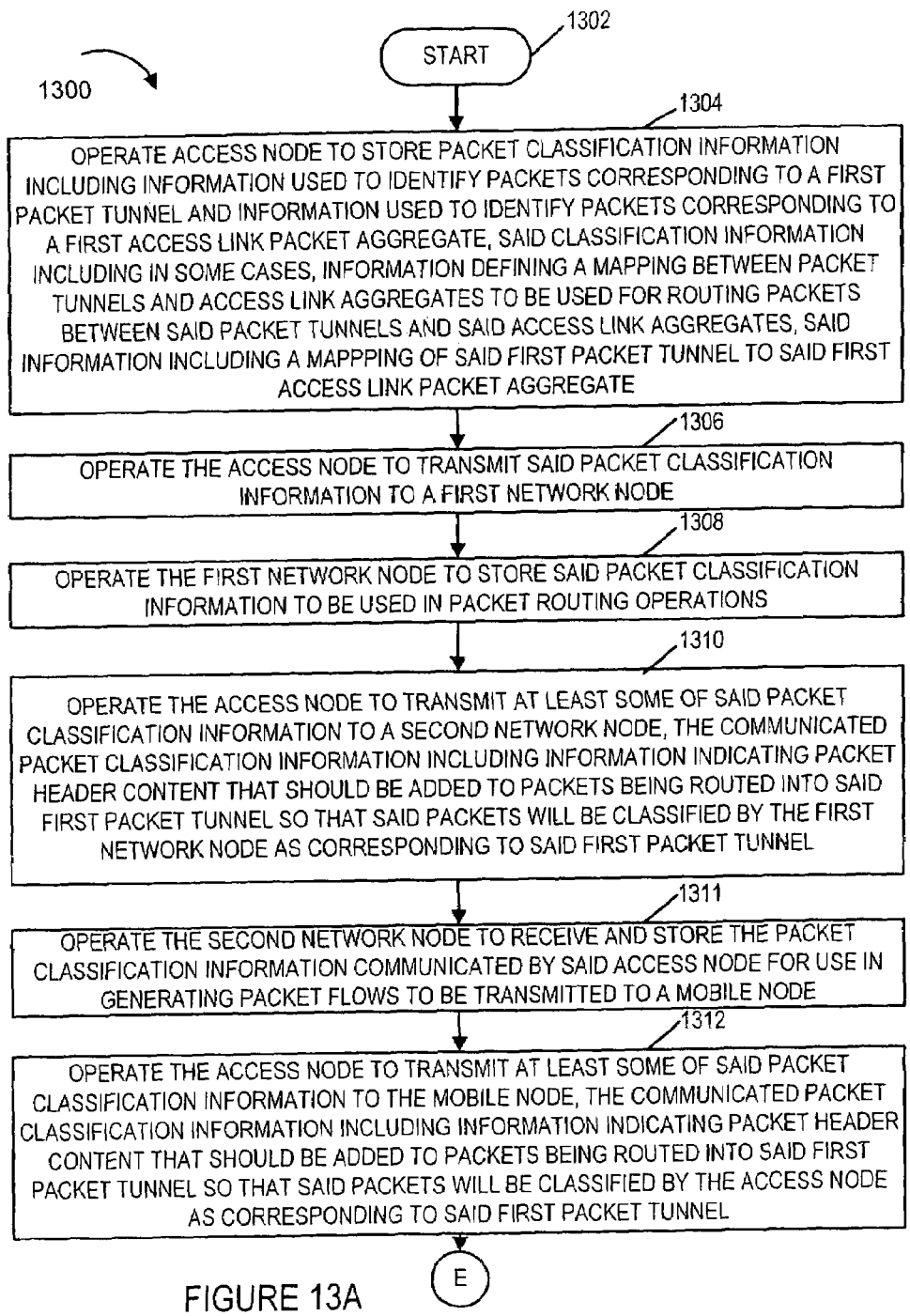
FIG. 13 illustrates various steps performed as part of an exemplary communication method of the present invention.
Figure 13B:
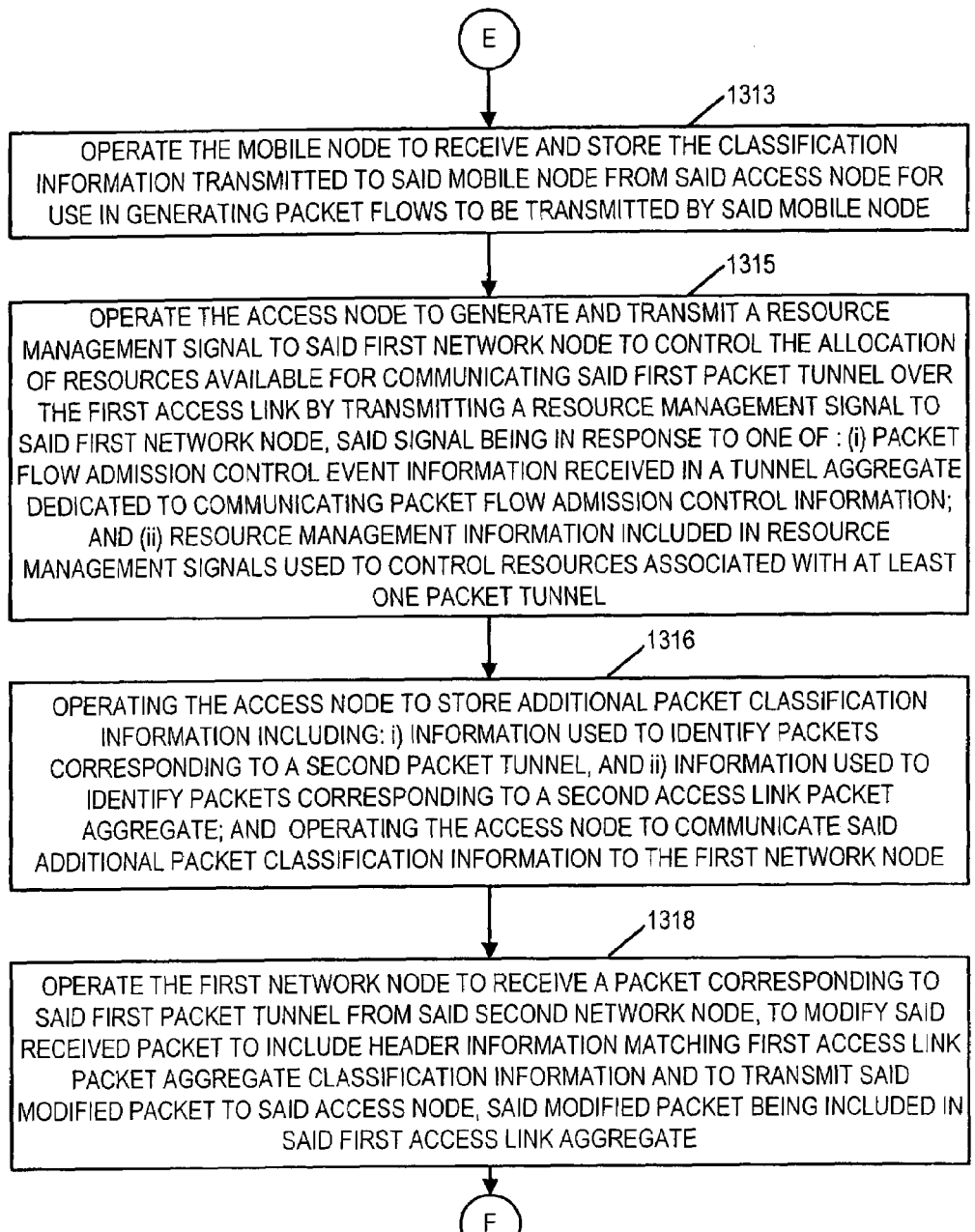
Figure 13C:
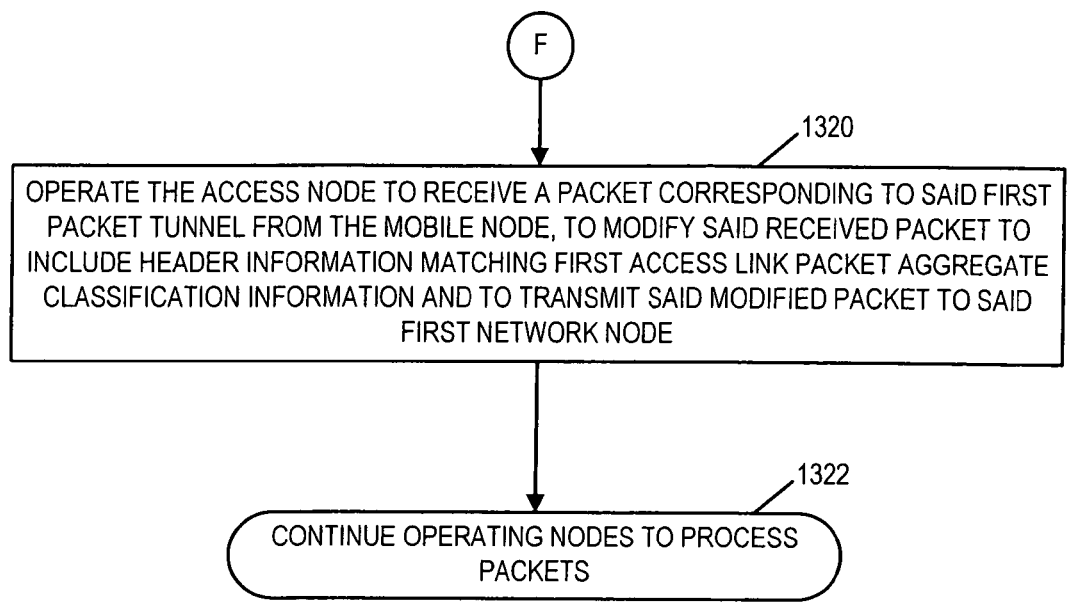

FIG. 13 is a flowchart 1300 showing various steps performed as part of a communications method in accordance with one exemplary embodiment. In step 1302, operation of the exemplary communications method is started. Operation proceeds to step 1304. In step 1304, an access node (AN) 200 is operated to store packet classification information including information used to identify packets corresponding to a first packet tunnel and information used to identify packets corresponding to a first access link packet aggregate. The classification information includes, in some cases, information defining a mapping between packet tunnels and access link aggregates to be used for routing packets between said packet tunnels and said access link aggregates, said information including a mapping of said first packet tunnel to said first access link aggregate.

Operation proceeds from step 1304 to step 1306, where the access node 200 is operated to transmit said packet classification information to a first network node, e.g., an access aggregation peer router node (APR) 300. In step 1308, the first network node (APR) 300 is operated to store the received packet classification information; the packet classification information is to be used in packet routing operations. Operation proceeds to step 1310, where the access node 200 transmits at least some of said packet classification information to a second network node, e.g., a tunneling node (TN) 400. The packet classification information communicated in step 1310 includes information indicating packet header content that should be added to packets being routed into said first packet tunnel so that said packets will be classified by the first network node (APR) 300 as corresponding to said first packet tunnel. Operation proceeds form step 1310 to step 1311. In step 1311, the second network node (TN) 400 receives and stores the packet classification information communicated by said access node 200. The packet classification information received and stored in step 1311 is to be used by second network node (TN) 400 in generating packet flows to be transmitted to a mobile node, e.g., MN1 150.

In step 1312, the access node 200 transmits at least some of said packet classification information to the mobile node 150. The packet classification information communicated to the MN 150 includes information indicating packet header content that should be added to packets being routed into said first packet tunnel so that said packets will be classified by the access node 200 as corresponding to the first packet tunnel. Operation proceeds form step 1312 to step 1313 via connecting node E. In step 1313, the mobile node 150 receives and stores the classification information transmitted to said mobile node 150 from said access node 200. The classification information received and stored in step 1313, by MN 150 is for use in generating packet flows to be transmitted by MN 150. In step 1315, access node 200 generates and transmits a resource management signal to the first network node (APR) 300 to control the allocation of resources available for communicating said first packet tunnel over the access link 115 by transmitting a resource management signal to said first network node 300. The resource management signal generated and transmitted in step 1315 is in response to one of: (i) packet flow admission control event information received in a tunnel aggregate dedicated to communicating packet flow admission control information; and (ii) resource management information included in resource management signals used to control resources associated with at least one packet tunnel.

Operation proceeds from step 1315 to step 1316. In step 1316, the access node 200 stores additional packet classification information including: i) information used to identify packets corresponding to a second packet tunnel, and ii) information used to identify packets corresponding to a second access link packet aggregate. The access node 200 also communicates said additional packet classification information to the first network node (APR) 300. Operation proceeds form step 1316 to step 1318. In step 1318, the first network node (APR) 300 receives a packets corresponding to said first packet tunnel from said second network node (TN) 400, modifies said received packet to include header information matching first access link packet aggregate classification information, and then transmits said modified packet to said access node 200, where the said modified packet is included in said first access link aggregate. Operation proceeds form step 1318 to step 1320 via connecting node F. In step 1320, the access node 200 receives a packet corresponding to said first packet tunnel from the mobile node 150, modifies the said received packet to include header information matching first access link packet aggregate classification information, and transmits said modified packet to said first network node (APR) 300. Operation proceeds from step 1320 to step 1322. In step 1322 the nodes, e.g., access node 200, first network node (APR) 300, second network node (TN) 400, and mobile node 150 continue operating to process packets in accordance with the communications methods of the present invention.

FIG. 14 is an example of an aggregation management message 1400 which is used as the message 180 in some embodiments. The message 1400, like message 180, may be transmitted in a single packet having a source address 59 and a destination address 60. In various embodiments, the management message 1400, like message 180, is generated by the access node and then transmitted without the use of encapsulation. Thus, in such cases, the source address 59 will be an IP address corresponding to the access node which generates the message 1400. The destination address 60 is the address of the node to which message 1400 is being transmitted. The message 1400 includes a message identifier, e.g., a value which uniquely identifies the message during some time period in which such message identifiers are used. This allows a reply to message 1400 to indicate the particular message 1400 to which it corresponds by referencing the message identifier 61. The message 1400 includes information about multiple aggregate packet flows, e.g., access link aggregate packet flows. In FIG. 14, the first, second, fourth and sixth rows correspond to different aggregate packet flows. For each packet flow aggregate information concerning one or more constituent flows is included. Rows 2 and 3 include constituent flow information corresponding to the aggregate identified by aggregate identifier 2 62'. Rows 4 and 5 include constituent flow information corresponding to the aggregate identified by aggregate identifier 3 62'''. The information included in message 1400 associated with each aggregate packet flow includes an aggregate identifier 62, aggregate direction information 63, information on the resources allocated for use by the particular aggregate 64, an aggregate resource type indicator 65 and an aggregate classifier 66. The aggregate classifier 66 includes information sufficient to classify packets as corresponding to the indicated aggregate, e.g., packet source address, destination address and/or other information found in a packet header such as differential service information, which can be used to correlate a received packet to the indicated aggregate. Associated with each aggregate is constituent flow information for one or more flows. The constituent flow information includes a constituent flow identifier 67 used to uniquely identify the flow defined by the corresponding constituent classifier 68. Information about resources associated with the constituent flow is provided by the content of constituent resource field 69. A resource type indicator is included for each consistent flow in the FIG. 14 embodiment to indicate information about the type of resources associated with the particular consistent flow. Message 1400 includes, in some embodiments, an additional field which indicated the number of packet flow aggregates for which information is included in the message. FIG. 14 is a relatively detailed example. Other embodiments are possible where a message would include some subset of the exemplary information of message 1400. Each of exemplary messages 180 shown in FIG. 7 are examples of messages which include a subset of the information found in message 1400. Note that messages 180 may be communicated as an IP packet without the use of encapsulation and with a source and destination IP address included in the packet header.

Flows which are identified by the constituent classifier 68 will in some cases be flows between a mobile node or access node and a mobile nodes corresponding Mobile IP Home Agent. In some cases such a flow will pass over the packet flow aggregate identified by classifier 66 and aggregate identifier 67. Thus, the constituent flow classifier information 68 may include the source address of the mobile node or access node. however, in such a case such information will normally not appear elsewhere in the message 1400 since the IP message packet 1400 is not encapsulated.

It should be appreciated, that in the present application defining mappings between packet flows and packet flow aggregates often involves generating classification information used to identify the packets of a constituent packet flow, classification information used to identify packets which correspond to said packet flow aggregate and storing mapping information or otherwise indicating a relationship between a packet flow identified by the packet flow classification information and a packet flow aggregate identified by the packet flow aggregate classification information. One way of indicating a mapping between a packet flow aggregate and a constituent packet flow is to use the same classification information, e.g., header information, used to identify both the constituent packet flow and packet flow aggregate to which the constituent packet flow is to be mapped.

It should be appreciated that bandwidth over a link or connection is one exemplary resource that is frequently allocated amongst different packet flow aggregates in accordance with the present invention. In some exemplary embodiments, where ample bandwidth exists between a mobile node's home agent and the first network node to which an access node is connected exists, and the constraint on bandwidth to the access node is the access link between the access node and the first network node, aggregate packet flow resource management signals are used to control allocation of resources over the access link, e.g., based on wireless link conditions to the mobiles connected to the access node. In some such embodiments, the resource allocation signals used to control allocation of resources over the access link also control the allocation of resources for the tunnel between the MIP home agent and the mobile node or access node elsewhere in the network. In such a system, the access link aggregate management signals for a particular access link aggregate may be used as the management signal for other portions of the MIP tunnel which passes through the access link aggregate. While this may result in over provisioning of some resources for other portions of the MIP tunnel, the over provisioning is likely to occur in the resource rich network core making the tradeoff between possibly wasted bandwidth and reduced management signaling in the network a potentially worthwhile trade off. In some embodiments, signaling to provision resources for MIP tunnels to a mobile node Home Agent node is limited to the access link, e.g., in the form of packet flow aggregate management messages. These embodiments work under the assumption that the access link is the critical link for the MIP tunnel and that if sufficient resources can be obtained on the access link between a core node and the access node operating as a wireless access router, sufficient resources will probably be available deeper in the core of the network even without management signaling to ensure the resources availability. In such cases, MIP tunnel management resource signaling can be significantly reduced or eliminated entirely.

Messages described in the present patent application are stored in the memory of the nodes which generate, receive said messages and the nodes through which said messages are communicated. Accordingly, in addition to being directed to methods and apparatus for generating, transmitting and using novel messages of the present invention, the present invention is also directed to machine readable media, e.g., memory, which stores one or more of the novel messages of the type described and shown in the text and figures of the present application.

The techniques of the present invention may be implemented using software, hardware and/or a combination of software and hardware. The present invention is directed to apparatus, e.g., base stations and routers, in the communications system which implement the present invention. The invention is also directed to methods, e.g., method of controlling and/or operating base stations and/or communications systems, e.g., routers, in accordance with the present invention. The present invention is also directed to machine readable medium, e.g., ROM, RAM, CDs, hard discs, etc., which include machine readable instructions for controlling a machine to implement one or more steps in accordance with the present invention.

Each of the U.S. Patent applications identified in the related applications section of this patent application are hereby expressly incorporated by reference. Examples and descriptions of features of the invention not described directly in the text of the present application but which are incorporated by reference are to be considered as additional exemplary embodiments and are not to be interpreted as limiting the embodiments and scope of the claims described herein. Accordingly, it is to be understood that elements or other limitations that may have been indicated as being needed or required for the embodiments described in the incorporated patent applications may not be needed or required for the embodiments described herein and therefore any such language included in the incorporated applications but not directly in the text of the present application is not to be interpreted as limiting the scope of the claims found in the present application.

What is claimed is:

1. A method of communicating packet flow aggregation information from a first node to a second node, in a system which uses a first packet flow aggregate to communicate a first set of constituent packet flows in a first direction between said first and second nodes, said method including:
   transmitting an aggregation management message from the first node, said aggregation management message including:
   i) a first aggregate identifier which uniquely identifies a first packet flow aggregate to which at least some of the information included in the aggregation message applies;
   ii) a first aggregate classifier including classification information which can be used to classify packet flows as corresponding to the packet flow aggregate identified by said first aggregate identifier; and
   iii) information identifying at least two constituent packet flows which are included in said first packet flow aggregate; and
   wherein said aggregation management message establishes a mapping between said at least two constituent packet flows and said packet flow aggregate classifier.

2. A method of communicating packet flow aggregation information from a first node to a second node, in a system which uses a first packet flow aggregate to communicate a first set of constituent packet flows in a first direction between said first and second nodes, said method including:
   transmitting an aggregation management message from the first node, said aggregation management message including:

i) a first aggregate identifier which uniquely identifies a first packet flow aggregate to which at least some of the information included in the aggregation message applies;
ii) a first aggregate classifier including classification information which can be used to classify packet flows as corresponding to the packet flow aggregate identified by said first aggregate identifier; and
iii) information identifying at least two constituent packet flows which are included in said first packet flow aggregate; and wherein said step of transmitting said aggregation message includes transmitting in said message, information indicating the direction of said first packet flow aggregate.

3. The method of claim 2, wherein said information identifying at least two constituent packet flows which are included in said first packet flow aggregate includes, for each identified constituent packet flow:
i) a unique constituent packet flow identifier; and
ii) information indicating resources allocated for said identified constituent packet flow.

4. The method of claim 2, wherein said step of transmitting said aggregation message includes transmitting in said message, information including:
i) a second aggregate identifier which uniquely identifies a second packet flow aggregate to which at least some of the information included in the aggregation message applies;
ii) a second aggregate classifier including classification information which can be used to classify packet flows as corresponding to the packet flow aggregate identified by said second aggregate identifier; and
iii) information identifying at least two constituent packet flows which are included in said second packet aggregate.

5. The method of claim 2, wherein said step of transmitting said aggregation message includes transmitting in said message, information including:
a second aggregation direction indicator, said aggregation direction indicator indicating an aggregation direction for said second packet flow aggregate which is opposite to the direction of said first packet flow aggregate.

6. The method of claim 1, further comprising:
transmitting a packet flow aggregate resource allocation update message from said first node to said second node, said packet flow aggregate resource allocation update message including:
a message identifier identifying said message as a packet flow aggregate resource allocation update message; and
information indicating downlink resources available for allocation to downlink packet flow aggregates.

7. The method of claim 6, wherein said packet flow aggregate resource allocation update message further includes:
a set of downstream resource allocation weights used to control allocation of said indicated available downlink resources amongst a plurality of downlink packet aggregates.

8. The method of claim 6, wherein said packet flow aggregate resource allocation update message further includes:
information indicating uplink resources available to be allocated to uplink packet flow aggregates.

9. The method of claim 8, wherein said packet flow aggregate resource allocation update message further includes:

a set of upstream resource allocation weights used to control allocation of said indicated uplink resources amongst a plurality of uplink packet aggregates.

10. The method of claim 1, further comprising:
transmitting a packet flow aggregate resource allocation reply message from said second node to said first node, said packet flow aggregate resource reply message including:
a packet flow aggregate identifier; and
information indicating a positive or negative acknowledgment of a previous message from the first node relating to resource allocation to at least one packet flow aggregate.

11. The method of claim 10, further comprising, transmitting in said packet flow aggregate resource reply message a set of modified resource allocation weights to be used in controlling allocation of resources to the packet flow aggregate identified by the packet flow aggregate identifier included in said packet flow aggregate resource allocation reply message.

12. The method of claim 11, further comprising, transmitting in said packet flow aggregate resource reply message information indicating a modified set of resources available for use by the packet flow aggregate identifier included in said packet flow that is identified by the packet flow aggregate resource allocation reply message.

13. A communications method for use in a communications system including a first node, a second node, a third node and a fourth node, said third node having an IP address used to identify packets transmitted to or transmitted from said third node, a packet flow existing between said third node and said fourth node, each packet included in said packet flow including the third address, said packet flow passing through said first and second nodes, the method comprising:
generating at said first node an aggregate management message that establishes a mapping between said packet flow and a packet flow aggregate extending between said first and second nodes to be used to convey said packet flow, said aggregate management message including:
i) an aggregate classifier including information used to classify packets as corresponding to said packet flow aggregate;
ii) at least one packet flow classifier including information used to classify packets as corresponding to said at least one packet flow; and
a source address corresponding to said first node, wherein any IP packet address included in the aggregate management message within said message but outside said packet flow classifier being different from the IP address of said third node; and
transmitting said generated aggregate management message to said second node.

14. The method of claim 13, wherein said third node is a mobile node, the first node is an access node coupled to said mobile node by a wireless communication link, said second node is a network node coupled to said access node and wherein said fourth node is a mobile IP Home agent node.

15. The method of claim 13, wherein the step of generating said aggregate management message includes:
incorporating information into said message indicating resources assigned for said packet flow aggregate.

16. The method of claim 13, wherein the step of generating said aggregate management message includes:

incorporating an aggregate identifier which uniquely identifies said packet flow aggregate, and a constituent flow identifier that uniquely identifies said packet flow.

17. The method of claim 13, wherein the step of generating said aggregate management message includes:

incorporating at least one additional packet flow classifier corresponding to another packet flow to be included in said packet flow aggregate.

18. The method of claim 13, wherein the step of generating said aggregate management message includes:

incorporating at least one additional packet aggregate classifier corresponding to another packet aggregate extending between said first and second nodes.

19. The method of claim 13, wherein the step of generating said aggregate management message includes:

incorporating aggregate direction indication information indicating the direction of said packet flow aggregate, this being one of either; i) from the first node to the second node or ii) from the second node to the first node.

20. The method of claim 18, wherein the step of generating said aggregate management message includes:

incorporating aggregate parameter direction indication information indicating that said packet flow aggregate corresponds to a different direction than said another packet flow aggregate that has either a packet aggregate classifier or a packet aggregate identifier included in said message.

21. The method of claim 13, wherein the step of generating said aggregate management message includes:

incorporating a message identifier used to uniquely identify the message within a plurality of such generated messages.

22. The method of claim 13, wherein the step of generating said aggregate management message includes:

incorporating information indicating resources specifically required for one or more packet flows for which the associated packet flow classifier or identifier is included in said message.

23. The method of claim 1, wherein said first node is a base station.

24. The method of claim 2, wherein said first node is a base station.

25. The method of claim 13, wherein said first node is a base station.

* * * * *